(12) United States Patent
Scarlatescu et al.

(10) Patent No.: US 9,219,421 B2
(45) Date of Patent: Dec. 22, 2015

(54) FORWARD BOOST POWER CONVERTERS AND METHODS

(71) Applicant: Solantro Semiconductor Corp., Ottawa (CA)

(72) Inventors: Gabriel Scarlatescu, Bucharest (RO); Raymond Kenneth Orr, Kanata (CA); Edward Keyes, Ottawa (CA)

(73) Assignee: Solantro Semiconductor Corp., Ottawa, Ontario (CA)

( * ) Notice: Subject to any disclaimer, the term of this patent is extended or adjusted under 35 U.S.C. 154(b) by 358 days.

(21) Appl. No.: 13/657,171

(22) Filed: Oct. 22, 2012

(65) Prior Publication Data

US 2014/0098572 A1   Apr. 10, 2014

Related U.S. Application Data

(60) Provisional application No. 61/711,529, filed on Oct. 9, 2012.

(51) Int. Cl.
*H02M 3/335* (2006.01)
*H02M 1/00* (2007.01)

(52) U.S. Cl.
CPC ...... *H02M 3/33546* (2013.01); *H02M 3/33584* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
USPC .............. 363/16, 19, 20, 21.01, 21.02, 21.04, 363/21.06, 21.12, 21.14, 56.01, 56.09, 363/56.12, 97, 101, 124
See application file for complete search history.

(56) References Cited

U.S. PATENT DOCUMENTS

| | | | |
|---|---|---|---|
| 4,415,959 A | 11/1983 | Vinciarelli | |
| 6,934,167 B2 * | 8/2005 | Jang et al. | 363/21.02 |
| 7,606,051 B1 * | 10/2009 | Wittenbreder, Jr. | 363/39 |
| 2011/0032731 A1 * | 2/2011 | Coleman et al. | 363/21.12 |

* cited by examiner

*Primary Examiner* — Nguyen Tran
(74) *Attorney, Agent, or Firm* — Woodard Emhardt Moriarty McNett & Henry LLP

(57) ABSTRACT

Forward boost power converters, and related methods, are disclosed. In a switching mode power converter coupled between a first terminal pair and a second terminal pair, a first inductance is coupled to a first switch in a first circuit path across the first terminal pair. A capacitance is coupled to a second inductance in a second circuit path, and to the first inductance in a third circuit path. During their respective conduction periods, the first switch couples the first inductance across the first terminal pair, a second switch completes a circuit between the second terminal pair and one of: the second circuit path or the third circuit path, and a third switch completes the other of: the second circuit path and the third circuit path. Energy transfer involves both substantially linearly varying currents and substantially half sinusoidal current pulses.

23 Claims, 23 Drawing Sheets

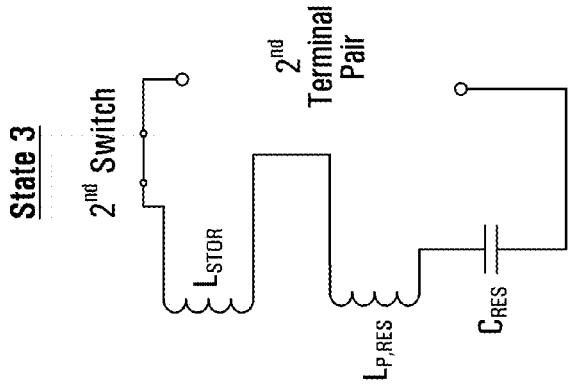
FIG. 18  FIG. 19  FIG. 20
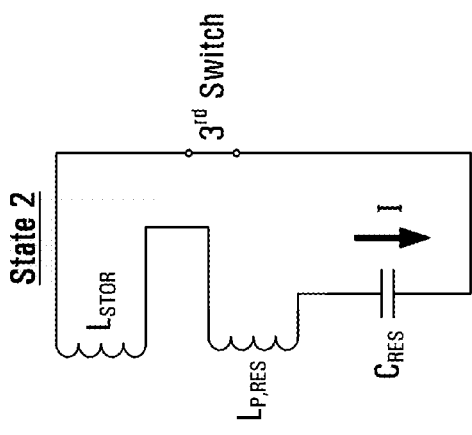
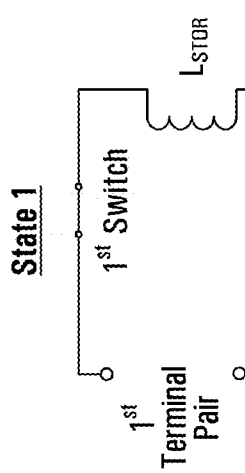
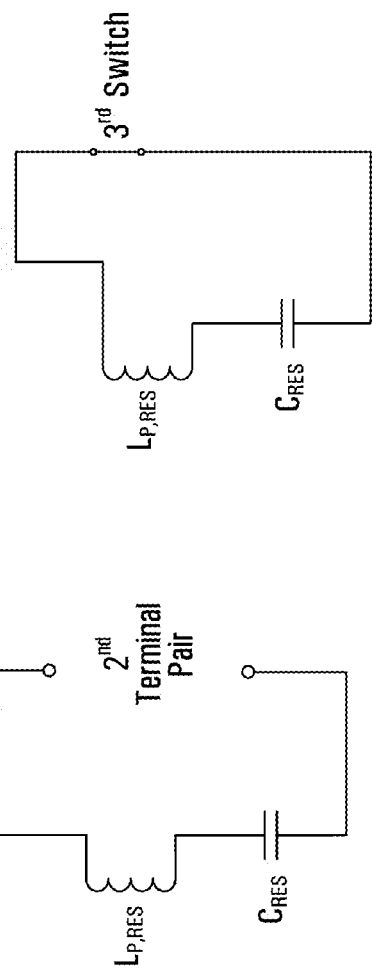
FIG. 21
FIG. 22

FORWARD BOOST POWER CONVERTERS AND METHODS

CROSS-REFERENCE TO RELATED APPLICATION

This application claims the benefit of U.S. Provisional Patent Application Ser. No. 61/711,529, filed on Oct. 9, 2012, entitled "FORWARD BOOST POWER CONVERTERS AND METHODS", the entire contents of which are incorporated herein by reference.

FIELD OF THE INVENTION

This invention relates generally to switching power converters and more particularly to frequency modulated power converters with resonant topologies. Power converters are alternatively referred to as DC (Direct Current) to DC converters, DC to AC (Alternating Current) converters, AC to AC converters, AC to DC converters, DC or DC to DC regulators, AC or AC to DC regulators, switching mode power converters, switch mode regulators or power supplies, etc. The term "power converter" or "converter" is used herein to include all such terms.

BACKGROUND

A power converter is a circuit which converts current at one voltage to current at another voltage. Switching converters use one or more switches to effect this conversion. Converters that control the output voltage by using a constant "on" time for the switch(es) and varying the switching frequency are called frequency modulated converters. Resonant converters are converters that use inductive and capacitive (LC) reactive elements in resonance to transfer power from an input source to the output.

Design objectives of power converters include: maximizing power conversion efficiency from input to output; minimizing component count and cost; and minimizing stress on the various converter components to maximize reliability. Another important design objective is a monotonic power transfer function. The transfer function relates the output power of the converter to its control variable. For frequency modulated converters, the control variable is the switching frequency.

SUMMARY

According to an aspect of the present disclosure, a switching mode power converter coupled between a first terminal pair and a second terminal pair includes: a first inductance coupled to a first switch in a first circuit path across said first terminal pair, said first switch coupling said first inductance across said first terminal pair during a conduction period of said first switch; a capacitance coupled to a second inductance in a second circuit path, and to said first inductance in a third circuit path; a second switch and a third switch, said second switch completing a circuit between said second terminal pair and one of: said second circuit path and said third circuit path during a conduction period of said second switch, said third switch completing the other of: said second circuit path and said third circuit path during a conduction period of said third switch.

Said first terminal pair and said second terminal pair may share a common terminal.

In some embodiments, said first terminal pair is an input terminal pair and said second terminal pair is an output terminal pair, with said capacitance transferring energy to said output terminal pair during said conduction period of said second switch.

Said first inductance may be coupled to said capacitance and transfer energy to said output terminal pair during said conduction period of said second switch.

Said first inductance could be coupled to said capacitance and transfer energy to said capacitance during said conduction period of said third switch.

In some embodiments, said first terminal pair is an output terminal pair and said second terminal pair is an input terminal pair, with said first inductance transferring energy to said output terminal pair during said conduction period of said first switch.

Said first inductance may be coupled to said capacitance and store energy from said input terminal pair during said conduction period of said second switch.

Said first inductance and said capacitance could transfer energy to said output terminal pair during said conduction period of said first switch.

In some embodiments, said first inductance is coupled to said capacitance through a transformer. Said first inductance could then include magnetisation inductance of said transformer. Said second inductance could include leakage inductance of said transformer.

Said transformer could include a first winding coupled across said first inductance and a second winding coupled in said second circuit path with said capacitance and said second inductance. Said transformer could further include a third winding.

If said transformer further includes a third winding, said switching mode power converter could further include a fourth switch coupled to said third winding and a reflected inductance of said transformer magnetisation inductance in a fourth circuit path across a third terminal pair, said fourth switch having said conduction period of said third switch and coupling said fourth circuit path across said third terminal pair during said conduction period of said third and fourth switches.

In another embodiment, said transformer further includes a third winding, and said switching mode power converter further includes: a fourth switch coupled to said third winding and a first reflected inductance of said transformer magnetisation inductance in a fourth circuit path across a third terminal pair, said fourth switch having said conduction period of said third switch and coupling said fourth circuit path across said third terminal pair during said conduction period of said third and fourth switches; a fifth switch coupled to a portion of said third winding and a second reflected inductance of said transformer magnetisation inductance in a in a fifth circuit path across a fourth terminal pair, said fifth switch having said conduction period of said third switch and coupling said fifth circuit path across said fourth terminal pair during said conduction period of said third and fifth switches.

The switching mode power converter could include one or more of: a capacitance coupled across said first terminal pair; and a capacitance coupled across said second terminal pair.

In some embodiments, said first inductance resonates during a non-conduction period of said first switch, said second switch and said third switch to produce a time varying voltage across said first switch.

Said first switch could enter said conduction period while said voltage is at an oscillatory minimum.

A method of operation of a switching mode power converter is also provided. The switching mode power converter is coupled between a first terminal pair and a second terminal pair, the converter including: a first inductance coupled to a first switch in a first circuit path across said first terminal pair; a capacitance coupled to a second inductance in a second circuit path, and to said first inductance in a third current circuit path; a second switch and a third switch. The method involves: closing of said first switch to couple said first inductance across said first terminal pair during a conduction period of said first switch; closing of said second switch to complete a circuit between said second circuit path or said third circuit path and said second terminal pair during a conduction period of said second switch so as to transfer energy into said second terminal pair; closing of said third switch to complete said second circuit path or said third circuit path during a conduction period of said third switch so as to transfer energy into said capacitance.

According to another aspect of the present disclosure, an apparatus includes: a switching mode power converter coupled between a first terminal pair and a second terminal pair, the converter including: a first inductance coupled to a first switch in a first circuit path across said first terminal pair; a capacitance coupled to a second inductance in a second circuit path, and to said first inductance in a third current circuit path; a second switch and a third switch; means for closing said first switch to couple said first inductance across said first terminal pair during a conduction period of said first switch; means for closing said second switch to complete a circuit between said second circuit path or said third circuit path and said second terminal pair during a conduction period of said second switch so as to transfer energy into said second terminal pair; means for closing said third switch to complete said second circuit path or said third circuit path during a conduction period of said third switch so as to transfer energy into said capacitance.

Another aspect of the present disclosure provides a method of energy transfer in a switching mode power converter. The method involves transfer of energy between an inductance and a first terminal pair by a substantially linearly varying current; and one of: transfer of energy resonantly between a capacitance and a second terminal pair by a substantially half sinusoidal current pulse and transfer of energy between said inductance and said capacitance by a substantially linearly varying current; and resonance of said capacitance for a half sinusoid cycle and transfer of energy between said inductance and said second terminal pair by a substantially linearly varying current.

The method could involve operation of said switching mode power converter in a forward direction wherein energy is transferred from said first terminal pair to said second terminal pair, and/or operation of said switching mode power converter in a reverse direction wherein energy is transferred from said second terminal pair to said first terminal pair.

Other aspects and features of embodiments of the present disclosure will become apparent to those ordinarily skilled in the art upon review of the following description.

BRIEF DESCRIPTION OF THE DRAWINGS

Examples of embodiments of the present disclosure will now be described in greater detail with reference to the accompanying drawings.

FIGS. 18 to 22 are schematic diagrams illustrating equivalent circuits for example forward boost converter operating states.

Figure 1A:
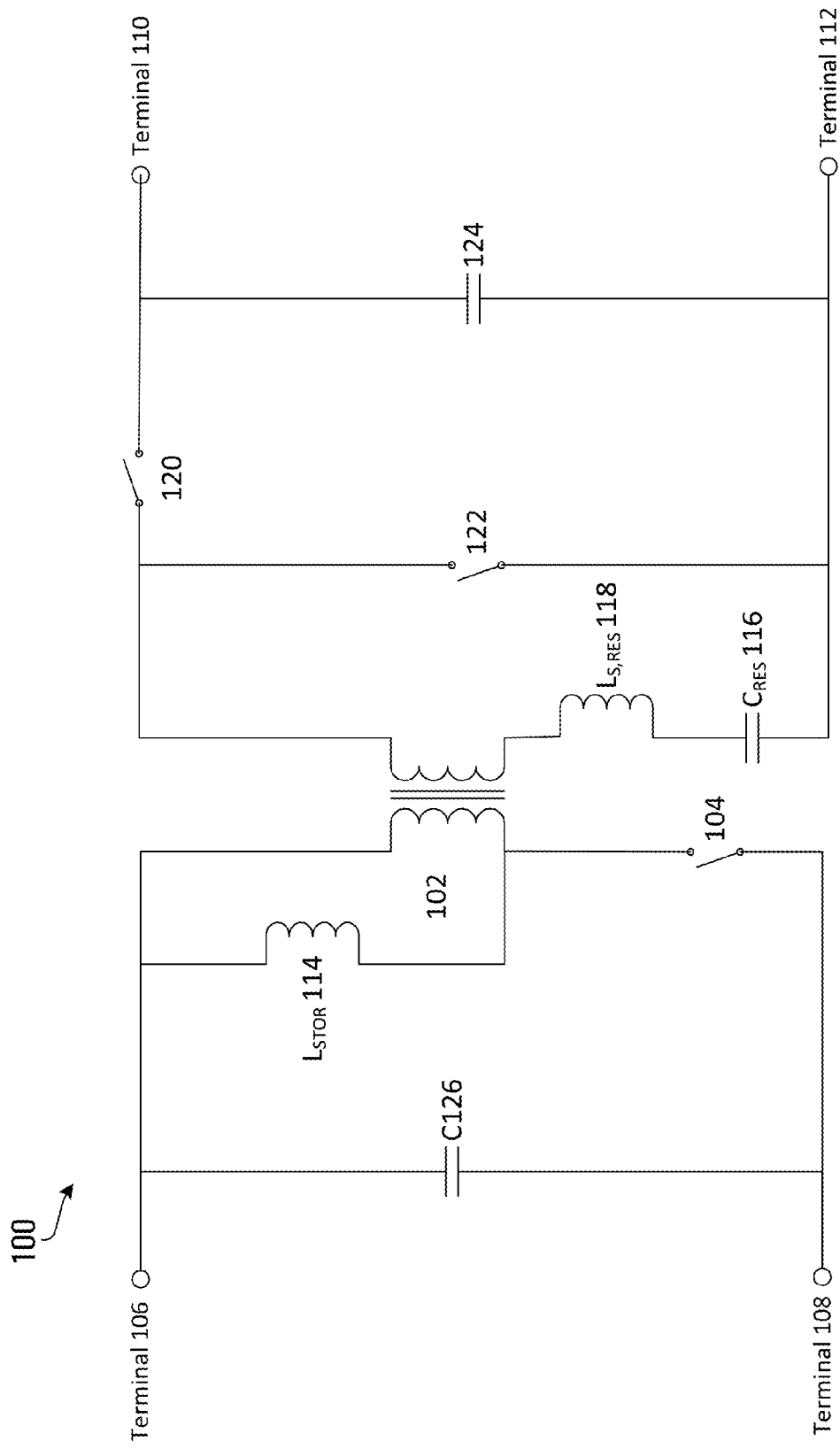
FIG. 1A is a schematic diagram illustrating an example forward boost converter.

It should be appreciated that the contents of the drawings are intended solely for illustrative purposes, and that the present disclosure is in no way limited to the particular example embodiments explicitly shown in the drawings and described herein.

DETAILED DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1A is a schematic diagram illustrating an example converter 100. The converter 100 is an example of a converter topology which is referred to herein as "Forward Boost". The primary winding of a transformer 102 is coupled at one end or terminal to a terminal 106 of a terminal pair 106, 108. The other end or terminal of the primary winding is coupled to a primary switch 104, which switchably couples the primary winding to the other terminal 108 of the terminal pair 106, 108. Transformer 102 provides energy storage, and optionally voltage multiplication. The transformer 102 has a turns ratio of N, where N is the ratio of the number of turns in the secondary winding to the number of turns in the primary winding. Transformer 102 has been drawn with a single secondary winding in FIG. 1. However, the forward boost topology disclosed herein could be used with transformers having multiple secondary windings.

The primary side of the transformer 102 has a storage inductance $L_{STOR}$ 114 coupled across the primary winding. The secondary winding of the transformer 102 is coupled to resonant capacitance $C_{RES}$ 116 and resonant inductance $L_{S,RES}$ 118. This series combination of the secondary winding, $L_{S,RES}$ 118, and $C_{RES}$ 116 is shunted by a switch 122, connects to terminal 110 through switch 120, and connects to terminal 112. Storage capacitance 124 is coupled across terminals 110, 112.

Figure 1B:
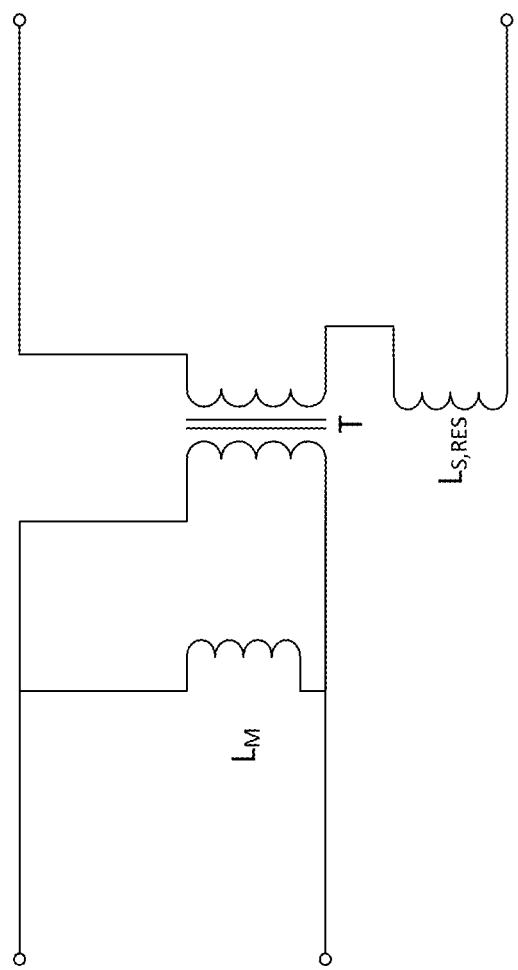
FIG. 1B is a schematic diagram illustrating a transformer's parasitic inductances.

Transformer 102 in FIG. 1A has been drawn as an ideal transformer with no parasitic elements. An actual transformer has a number of parasitic elements. Parasitic elements that could be exploited in the operation of a forward boost converter are the transformer's magnetisation and leakage inductances. FIG. 1B is a schematic diagram illustrating a transformer's parasitic inductances, including the location of the magnetisation and leakage inductances. The magnetisation inductance $L_M$ is across or in parallel with the primary transformer winding. The current drawn by $L_M$ represents the current required to magnetise the transformer's core. Transformers are normally designed to maximize the value of $L_M$ since the greater the value of $L_M$, the smaller the storage current. In a forward boost converter however, a small value of $L_M$ could be useful in storing energy during part of the converter cycle.

$L_M$ may therefore be deliberately decreased in order to increase the energy storage capacity of the transformer. In this respect it is similar to a conventional flyback DC to DC converter. In one embodiment $L_M$ is decreased by inserting a small air gap into the transformer core to increase its reluctance and increase its magnetizing current. In some embodiments of a forward boost converter, the transformer's magnetisation inductance is sufficiently small that no external storage inductor is required, thereby reducing the number of discrete components. Thus, in some embodiments, storage inductance 114 in FIG. 1A is the intrinsic or parasitic magnetisation inductance of the transformer 102 and is not an external discrete inductor.

Another parasitic transformer element that could be useful in a forward boost converter is the transformer's parasitic leakage inductance. Leakage inductance results from the imperfect coupling of magnetic flux between the primary and secondary windings. The leakage inductance of a transformer is typically much smaller than its magnetisation inductance. The leakage inductance is represented in FIG. 1B by inductance $L_{S,RES}$ having a value $L_{S,LEAK}$ in series with the secondary winding of the transformer. Alternatively and equivalently the leakage inductance could have been shown as an inductance in series with the primary winding. Transformer leakage inductance is normally considered to be an undesirable parasitic component. In a forward boost converter however, leakage inductance could be advantageously used in series with resonant capacitance $C_{RES}$ 116 to transfer energy. In some embodiments the transformer's leakage inductance is sufficiently large that no external resonance inductance is required, thereby reducing the number of discrete components. Thus, in some embodiments inductor $L_{S,RES}$ in FIG. 1A is the inherent leakage inductance of the transformer 102 and is not an external discrete inductor.

With reference again to FIG. 1A, switches 104, 120 and 122 may be implemented in a variety of ways, including power MOSFETs (Metal Oxide Semiconductor Field Effect Transistors), BJTs (Bipolar Junction Transistors), IGBTs (Insulated Gate Bipolar Transistors), junction diodes, and/or mechanical relays, for example. In the case of controllable switches, the opening and closing of switches 104, 120 and 122 may be controlled by a control means which is not shown.

The example converter 100 illustrated in FIG. 1A is bi-directional. Depending on the operation of switches 104, 120 and 122, power may be supplied to terminals 106 and 108 and output at terminals 110 and 112 or alternatively, power can be supplied to terminals 110 and 112 and output at terminals 106 and 108. The presence of capacitance 124 and capacitance 126 is dependent on the direction of power flow in the example converter 100. For instance, if the example converter 100 were to only operate with terminals 106 and 108 as the input then capacitance 126 might be unnecessary. Similarly if the example converter 100 were to only operate with terminals 110 and 112 as the input then capacitance 124 might be unnecessary. In practical implementations, however, it is expected that a capacitance 124, 126 would be coupled across each terminal pair 106, 108 and 110, 112. Capacitance across the input terminal pair, which could be 106, 108 or 110, 112 as noted above, need not necessarily be provided in a converter circuit, but could instead be in the form of a capacitance across the output terminals of a voltage source, for example.

Figure 2:
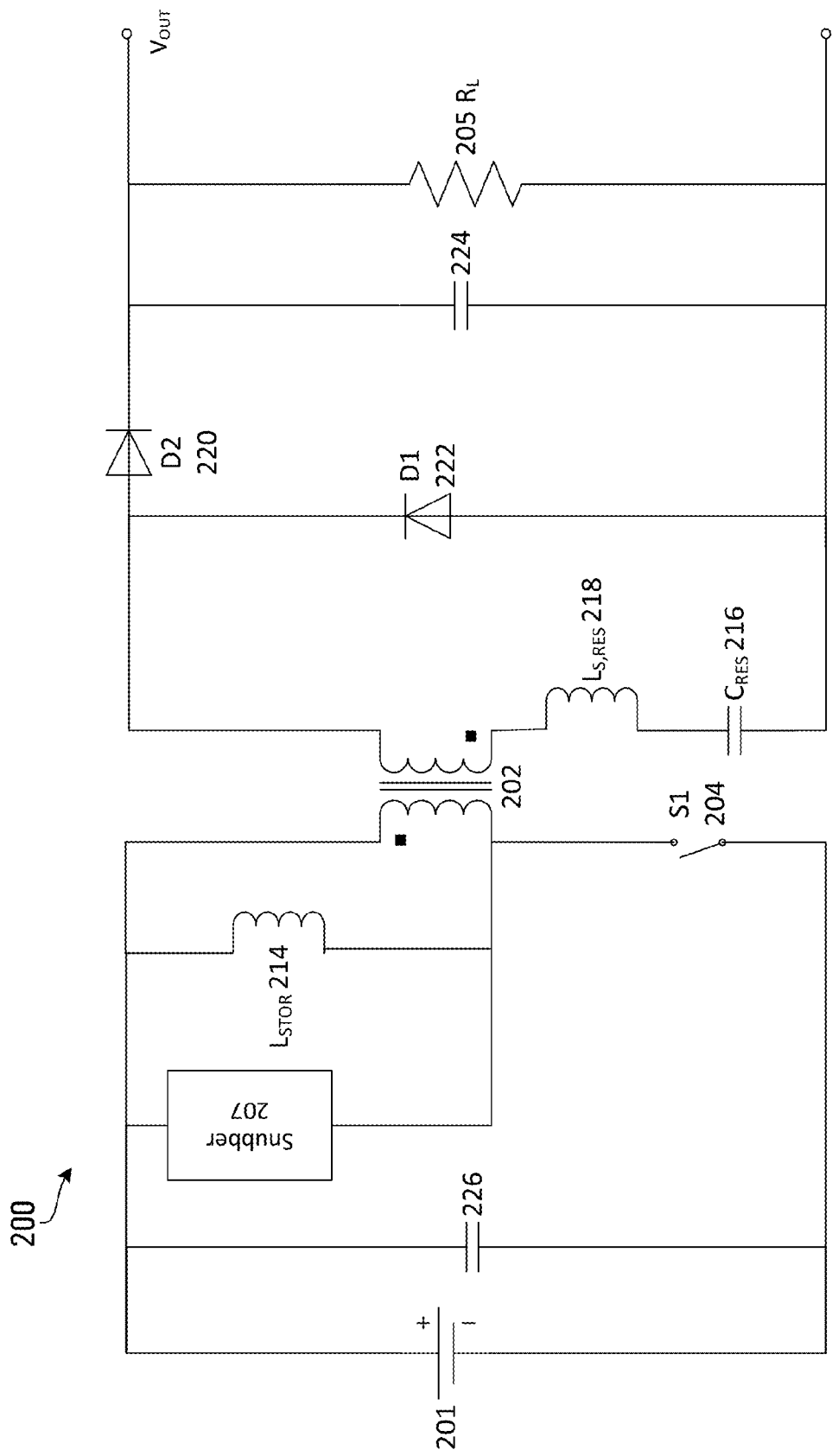
FIG. 2 is a schematic diagram illustrating an example forward boost converter using an anti-phase transformer.

FIG. 2 is a schematic diagram illustrating an example forward boost converter 200 using an anti-phase transformer. In the example converter 200 in FIG. 2, the primary-side terminals (106 and 108 in FIG. 1A) are the input terminals and the secondary-side terminals (110 and 112 in FIG. 1A) are the output terminals. Input voltage source 201 of value $V_{IN}$ is applied to the input terminals and load resistance 205 of value $R_L$ is coupled across the output terminals. In this embodiment, the switching elements 120 and 122 (FIG. 1A) are implemented as diodes D2 220 and D1 222 respectively.

Using standard notation, the polarity of each winding of the transformer 202 is indicated by the black dots. In the example embodiment shown in FIG. 2 the windings of the transformer 202 are arranged in anti-phase. However, in another embodiment, the windings might be arranged in phase. Although the transformer 202 is shown in FIG. 2 as a magnetic core transformer, in another embodiment it might be an air core transformer. In the example converter 200, storage inductance $L_{STOR}$ 214 consists entirely of the intrinsic magnetisation inductance of transformer 202 and there is no external storage inductor. Also in this embodiment, resonant inductance $L_{S,RES}$ 218 consists entirely of the intrinsic leakage inductance of transformer 202 of value $L_{S,LEAK}$ and there is no external resonant inductor.

There is optionally a "snubber" circuit 207 coupled across the primary winding of the transformer 202. The snubber circuit 207 is designed to limit the voltage stress on primary switch 204 when it switches off. High voltages can be created across primary switch 204 from the interruption of the current flowing in the storage inductance $L_{STOR}$ 214 when the switch opens. The snubber circuit 207 provides a current path when the switch 204 switches off and limits the voltages across the switch 204. Snubber circuits can be implemented in a variety of ways.

Figure 3A:
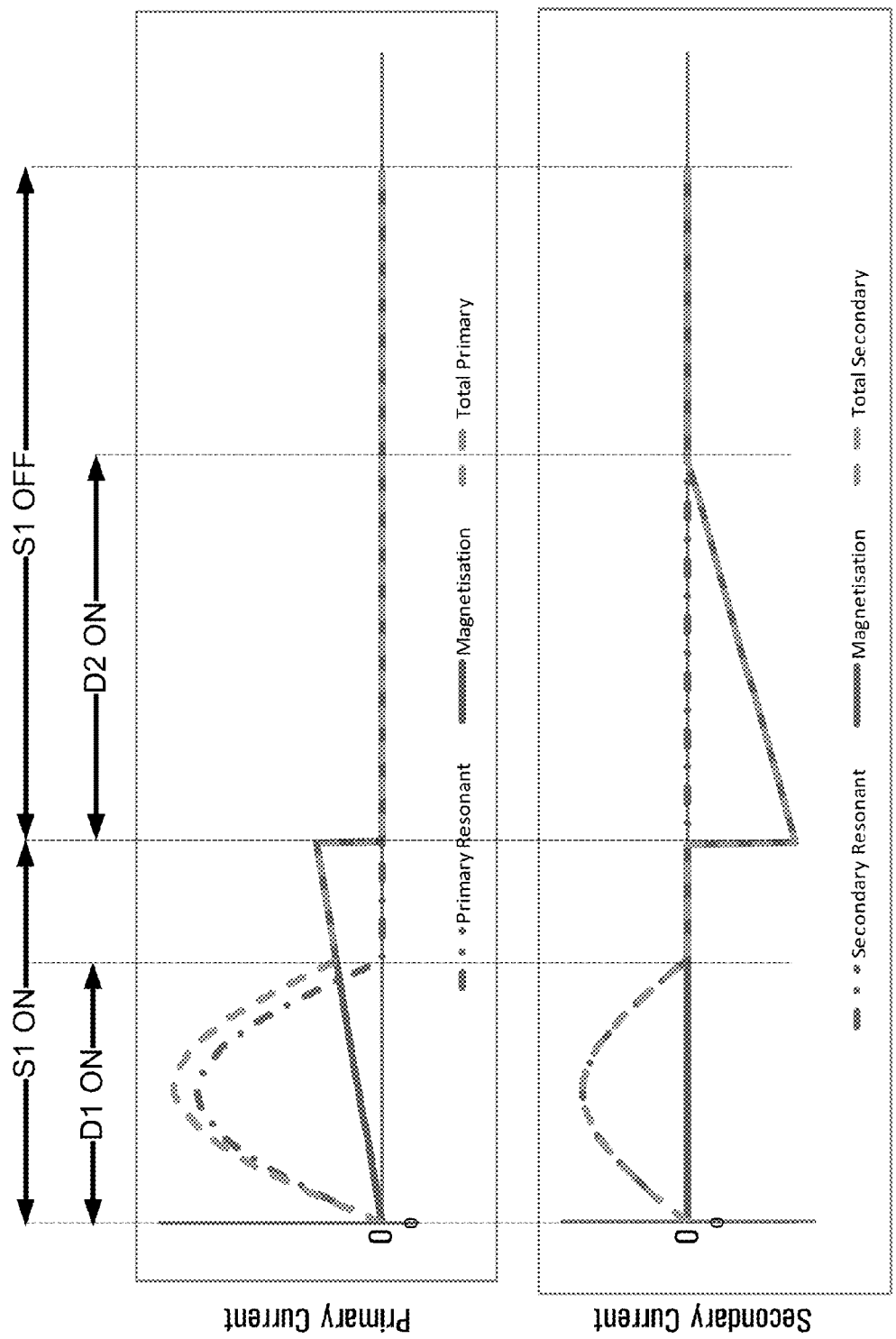
FIG. 3A is a current versus time graph illustrating resonant and storage current waveforms in the primary and secondary windings for the example forward boost converter 200 in FIG. 2.

FIG. 3A is a current versus time graph illustrating resonant and storage current waveforms in the primary and secondary windings for the example forward boost converter 200 in FIG. 2. FIG. 3A depicts components of currents in the primary and secondary windings of the transformer 202 for a complete cycle of operation of the example converter 200. FIG. 3A is intended to illustrate general waveform shapes, and units of current and time are arbitrary.

At time t=0 under steady load conditions, output capacitance 224 will have been previously charged to a voltage of value $V_{OUT}$ and resonant capacitance $C_{RES}$ 216 will have been previously charged to a voltage close to $V_{IN}*N$ where $V_{IN}$ is the input voltage and the N is the turns ratio of transformer 202. $V_{IN}$ and N are selected, for the purposes of illustration, such that their product is less than $V_{OUT}$ and diode 220 is therefore reverse biased and non-conducting. In one embodiment $V_{IN}*N$ is selected to be about 70% of $V_{OUT}$. Diode 222 is also reverse biased by the voltage across resonant capacitance $C_{RES}$ 116. The core of the transformer 202 will have been previously completely demagnetised so the currents in the primary and secondary windings of transformer 202 are both zero.

At time t=0 primary switch 204 closes to begin its conduction period, and the current in the primary winding ($I_P$) begins to increase from zero. As shown in FIG. 3A there are two components to the primary current. A first component, $I_{P1}$, shown in FIG. 3A as "Magnetisation", is the storage current flowing through storage inductance $L_{STOR}$ 214 and increases linearly with time (t). This current flows though the magnetisation inductance of the transformer 202 and serves to magnetise the core of transformer 202. The storage current creates no corresponding current in the secondary winding or energy transfer to the output side of the circuit. The storage current $I_{P1}$ is given by the formula:

$$I_{P1} = \frac{V_{IN} t}{L_{STOR}}.$$

The magnetic energy $E_{MAG}$ stored in an inductance of value L carrying current i is given by the equation:

$$E_{MAG} = \frac{L_{STOR} i^2}{2}.$$

Hence, the energy ($E_{MAG}$) stored in the storage inductance $L_{STOR}$ 214 at the end of the conduction period ($t_{on}$) is:

$$E_{MAG} = \frac{t_{ON}^2 V_{IN}^2}{2 L_{STOR}}.$$

Figure 4:
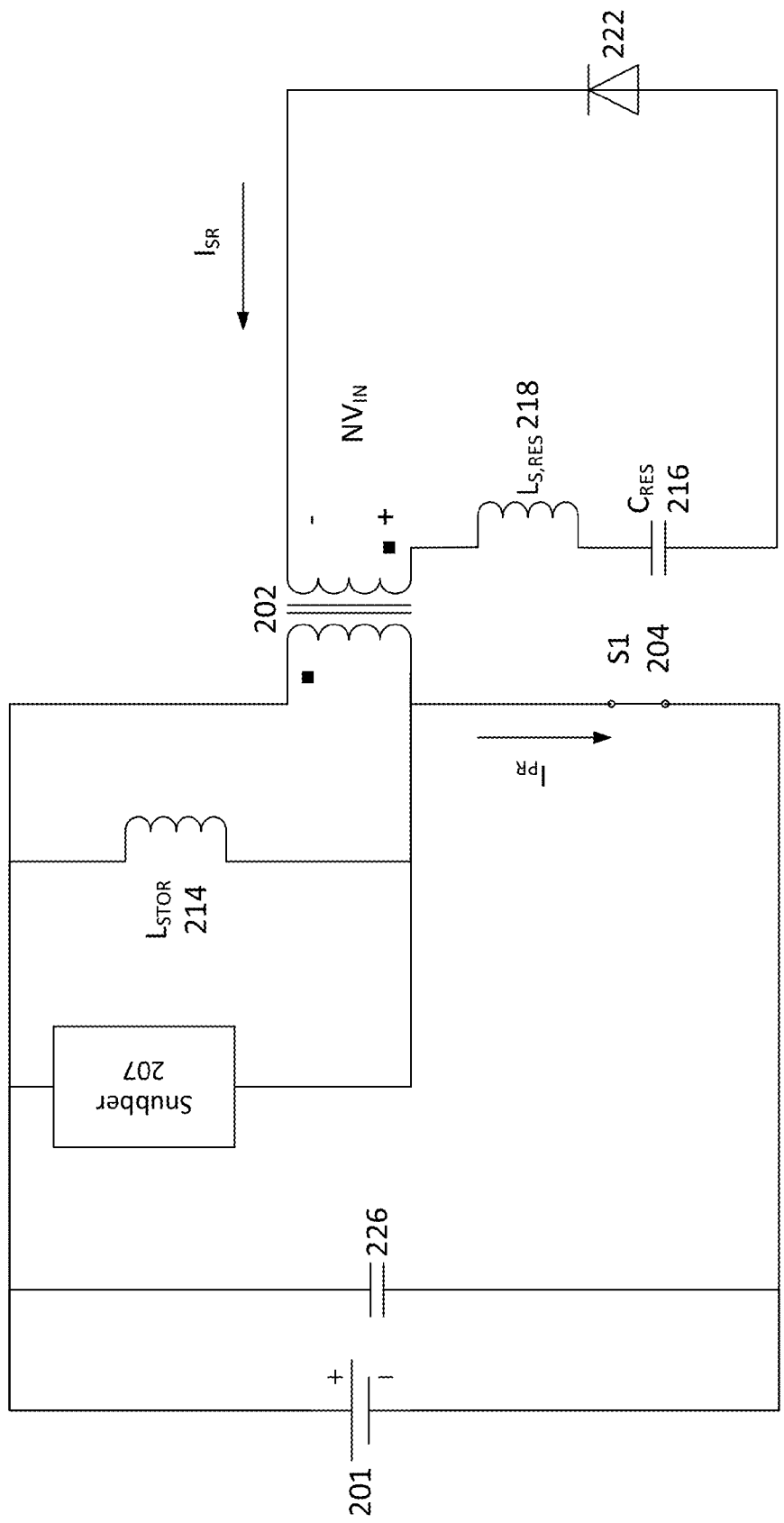
FIG. 4 is a schematic diagram illustrating an equivalent circuit for the example forward boost converter 200 in FIG. 2 while the primary switch 204 is closed.

A second component of the primary current ($I_{PR}$), shown in FIG. 3A as "Primary Resonant", is due to the resonant LC circuit on the secondary side of the transformer 202, consisting of resonant capacitance $C_{RES}$ 216 coupled in series with resonant inductance $L_{S,RES}$ 218. When primary switch 204 closes, a voltage of $V_{IN}$ appears across the primary winding of transformer 202, creating a voltage of magnitude $V_{IN}*N$, but of opposite polarity, across the secondary winding. The voltage is sufficiently larger than the voltage stored in resonant capacitor $C_{RES}$ 216 to forward bias diode 222. Diode 222 then begins its conduction period and provides a path for current to flow through the secondary winding of transformer 202, capacitor $C_{RES}$ 216 and inductor $L_{S,RES}$ 218. Diode 220 remains reverse biased. FIG. 4 is a schematic diagram illustrating an equivalent circuit for the example forward boost converter 200 in FIG. 2 while the primary switch 204 is closed.

This LC circuit as shown in FIG. 4 has resonant frequency $\omega_R$ given by the formula:

$$\omega_R = \frac{1}{\sqrt{L_{S,LEAK} C_{RES}}}.$$

The resonant secondary current ($I_{SR}$), shown in FIG. 3A as "Secondary Resonant", charges capacitance $C_{RES}$ 216, causing its voltage to increase by an amount $2*\Delta V$, equal to the time integral of the secondary current divided by the value of the capacitance. Under steady load the voltage of capacitance $C_{RES}$ 216 is symmetric around $V_{IN}*N$, and thus its voltage at the beginning of the cycle is $V_{IN}*N-\Delta V$.

The resonant secondary current $I_{SR}$ is a time varying sinusoid given by:

$$I_{SR} = \Delta V \sqrt{\frac{C_{RES}}{L_{S,LEAK}}} \sin(\omega_R t).$$

This resonant secondary current $I_{SR}$ is mirrored in the primary winding, producing the second component of primary current $I_{PR}$. The resonant primary current also has the form of a sinusoid and is given by the formula:

$$I_{PR} = N I_{PEAK} \sin(\omega_R t).$$

Resonant secondary current $I_{SR}$ can only flow while diode 222 is forward biased, hence both $I_{SR}$ and $I_{PR}$ are limited to at most a half cycle of the sinusoid as shown FIG. 3A. In practice the exact shape of the resonant primary current depends on the length of the conduction period of primary switch 204 ($t_{on}$), set by a switching control means. If the conduction period is longer than the half period of the sinusoid (T/2), then a full half cycle of primary and secondary resonant current will appear, as shown in FIG. 3A. If the conduction period is less than T/2 only a portion of the half sinusoid would appear. The period of the sinusoid (T) is given by the formula:

$$T = \frac{2\pi}{\omega_R}.$$

Resonant capacitance $C_{RES}$ 216 is sized such that its change in voltage is much less than its steady state voltage of $V_{IN}*N$. In one embodiment $V_{IN}*N$ is 300V and the change in voltage is 6V.

The energy transferred into capacitance $C_{RES}$ 216 during this half sinusoid charging cycle is proportional to $C_{RES}*\Delta V^2$. Thus the amount of energy transferred is independent of the value $L_{S,LEAK}$ of the leakage inductance of transformer 202.

Smaller values of $L_{S,LEAK}$ result in a narrower and higher half sinusoid pulse but the amount of energy transferred is the same. There are some practical limits, however. At very small values of $L_{S,LEAK}$ the current pulse will have such a large amplitude as to cause undesirable conduction losses. Therefore in some embodiments an external inductance may be advantageously added in series with the secondary winding to increase the value of the resonant inductance and reduce the peak of the current pulse.

At very large values of $L_{S,LEAK}$ the width of the half sinusoid will be so long that it will not complete before primary switch 204 is opened to end its conduction period. However, since the pulse width is only proportional to the square root of the leakage inductance, a wide range of values of $L_{S,LEAK}$ can be tolerated.

From the above analysis it will be apparent that the current in the primary winding of the transformer 202 during the conduction phase of primary switch 204 is the superposition of a linear ramp due to the storage inductance and a half sinusoid due to the LC resonant circuit as shown in FIG. 3A.

Energy is stored in the storage inductance $L_{STOR}$ 214 and in the resonant capacitance $C_{RES}$ 216 during the conduction phase of primary switch 204. When switch 204 opens the previously stored energy is transferred into load 205 and output capacitance 224.

When switch 204 opens, the current in the primary winding of the transformer 202 falls to zero and energy stored in storage inductance $L_{STOR}$ 214 and resonant capacitance $C_{RES}$ 216 begins to be transferred into load 205 and output capacitance 224. The effect of storage inductance $L_{STOR}$ 214 can be modeled as an equivalent inductance $L'_{STOR}$ of value $N^2 L_{STOR}$ in the output circuit. When switch 204 opens the voltage across $L'_{STOR}$ rises sufficiently to forward bias diode 220 and begin its conduction period, to thereby allow current to flow into load 205 and capacitance 224. Diode 222 becomes reverse biased to end its conduction period. Ideally, no primary current flows since switch 204 is open.

Figure 5:
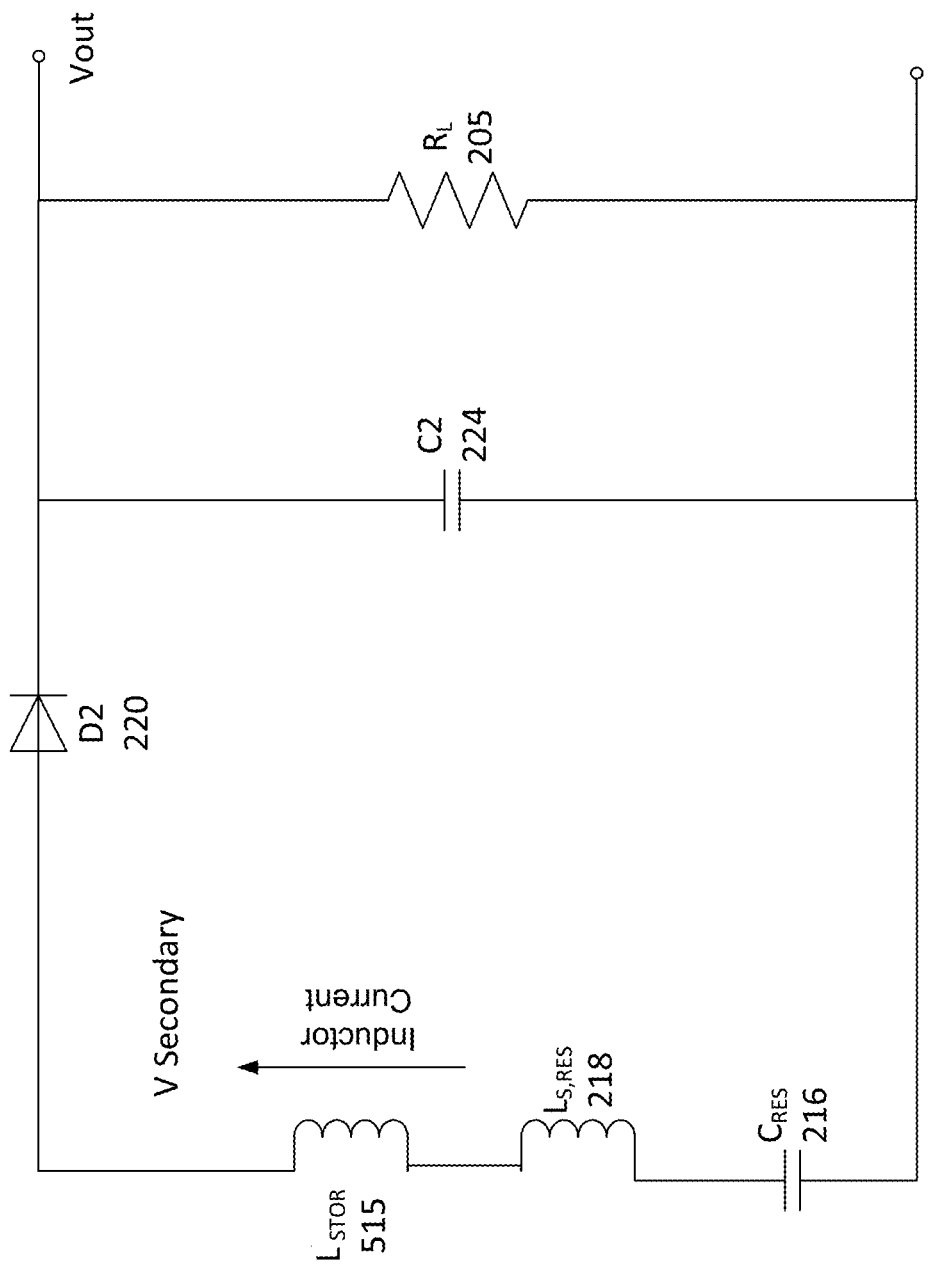
FIG. 5 is a schematic diagram illustrating an equivalent circuit for the example forward boost converter 200 in FIG. 2 when the primary switch 204 opens.

FIG. 5 is a schematic diagram illustrating an equivalent circuit for the example forward boost converter 200 in FIG. 2 when the primary switch 204 opens. As noted above, $L'_{STOR}$ 515 represents an equivalent inductance that models the effect of storage inductance $L_{STOR}$ 214.

Capacitance 224 is sized relative to inductance $L'_{STOR}$ 515 such that the output voltage of the converter $V_{OUT}$ will not change significantly. Therefore, the voltage on that side of inductance $L'_{STOR}$ 515 is effectively clamped to a diode drop above $V_{OUT}$. Similarly the other side of inductance $L'_{STOR}$ 515 is clamped to about $V_{IN}*N$ by capacitance $C_{RES}$ 216, resulting in a voltage of about $V_{OUT}-V_{IN}*N$ across inductance $L'_{STOR}$ 515. This voltage is mirrored across to the primary winding of transformer 202, creating a voltage of $V_{OUT}/N-V_{IN}$ across it. The voltage across primary switch 204 ($V_D$) therefore rises to about $V_{OUT}/N$.

The secondary winding current waveform is shown in FIG. 3A. The secondary winding current decreases approximately linearly to zero as the energy stored in inductance $L'_{STOR}$ 515 is transferring into capacitance 224 and load 205. The core of transformer 202 is also demagnetizing during this operation. The voltage of resonant capacitance $C_{RES}$ 216 also decreases to $V_{IN}*N-\Delta V$ as its stored energy is transferred into load 205 and output capacitance 224 by the current in inductance $L'_{STOR}$ 515, creating an additional "boost" of energy.

Once the core of transformer 202 is completely demagnetised, secondary current flow ceases and diode 220 becomes reverse biased, to end its conduction period, while diode 222 remains reverse biased. It should be noted that the equivalent circuit in FIG. 5 contains a series LC resonance consisting of inductance $L'_{STOR}$ 515, inductance $L_{S,RES}$ 218 and capacitance $C_{RES}$ 216. However, since the value of the inductance $L'_{STOR}$ 515 is so much larger than the value of the inductance $L_{S,RES}$ 218 the resonant behavior cannot be seen on the time scale shown in FIG. 3A, and the current waveform appears to be linear.

Figure 6:
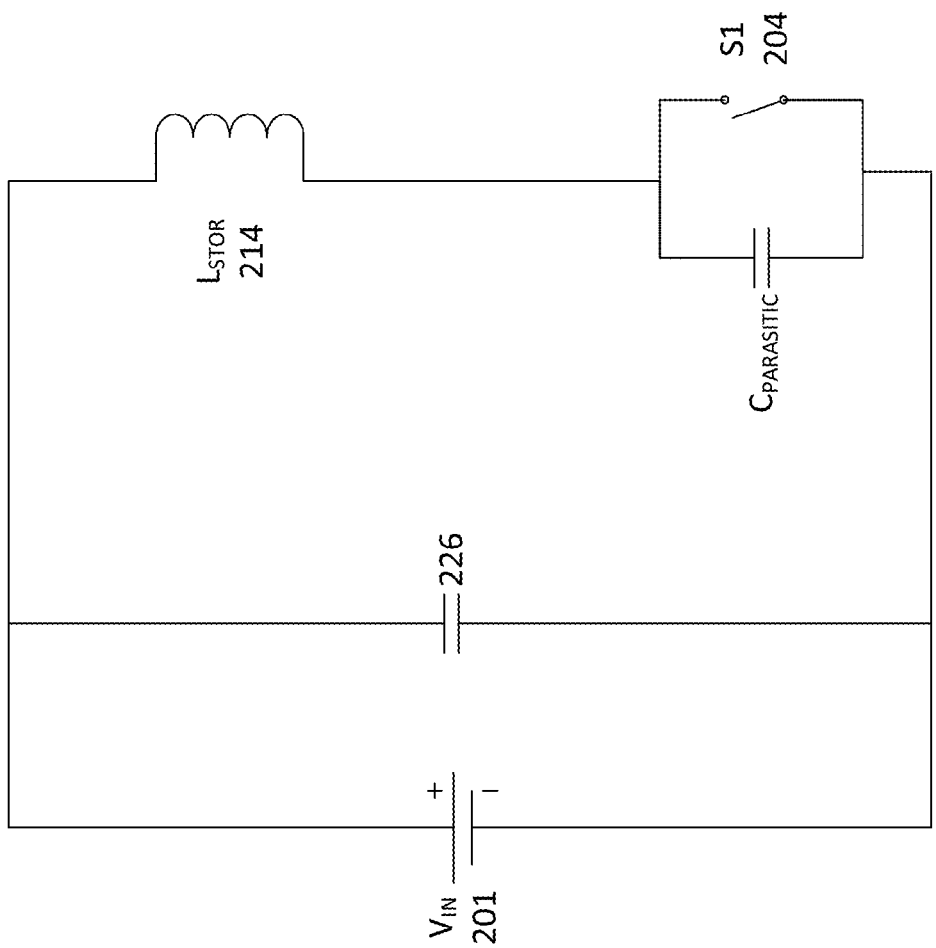
FIG. 6 is a schematic diagram illustrating an equivalent circuit for the example forward boost converter 200 in FIG. 2 during a transformer resonance period.

After the core of transformer 202 is demagnetized, the primary and secondary windings of the transformer are both open. The primary winding is opened by the opening of primary switch 204 and the secondary winding is opened by diodes 220 and 222 that are both reverse biased. Parasitic capacitances will typically exist across the diodes 220, 222 and the switch 204, however. If switch 204 is implemented with a power MOSFET for example, then its parasitic capacitance is substantially the MOSFET source drain capacitance. These parasitic capacitances together with the parasitic capacitance of the windings of transformer 202 create a parallel LC resonant circuit and the transformer magnetisation inductance will resonate. FIG. 6 is a schematic diagram illustrating an equivalent circuit for the example forward boost converter 200 in FIG. 2 during the transformer resonance period.

There is no energy transfer between input and output during this resonance period. When the input power to the example converter 200 is very low, it may be advantageous to keep the converter in this resonant state rather than have it continue to switch. This minimizes switching losses and maintains power efficiency. To exit the resonant state and begin the next cycle, the primary switch 204 could be closed when the voltage across it is at an oscillatory minimum. This further minimizes the switching loss.

Figure 3B:
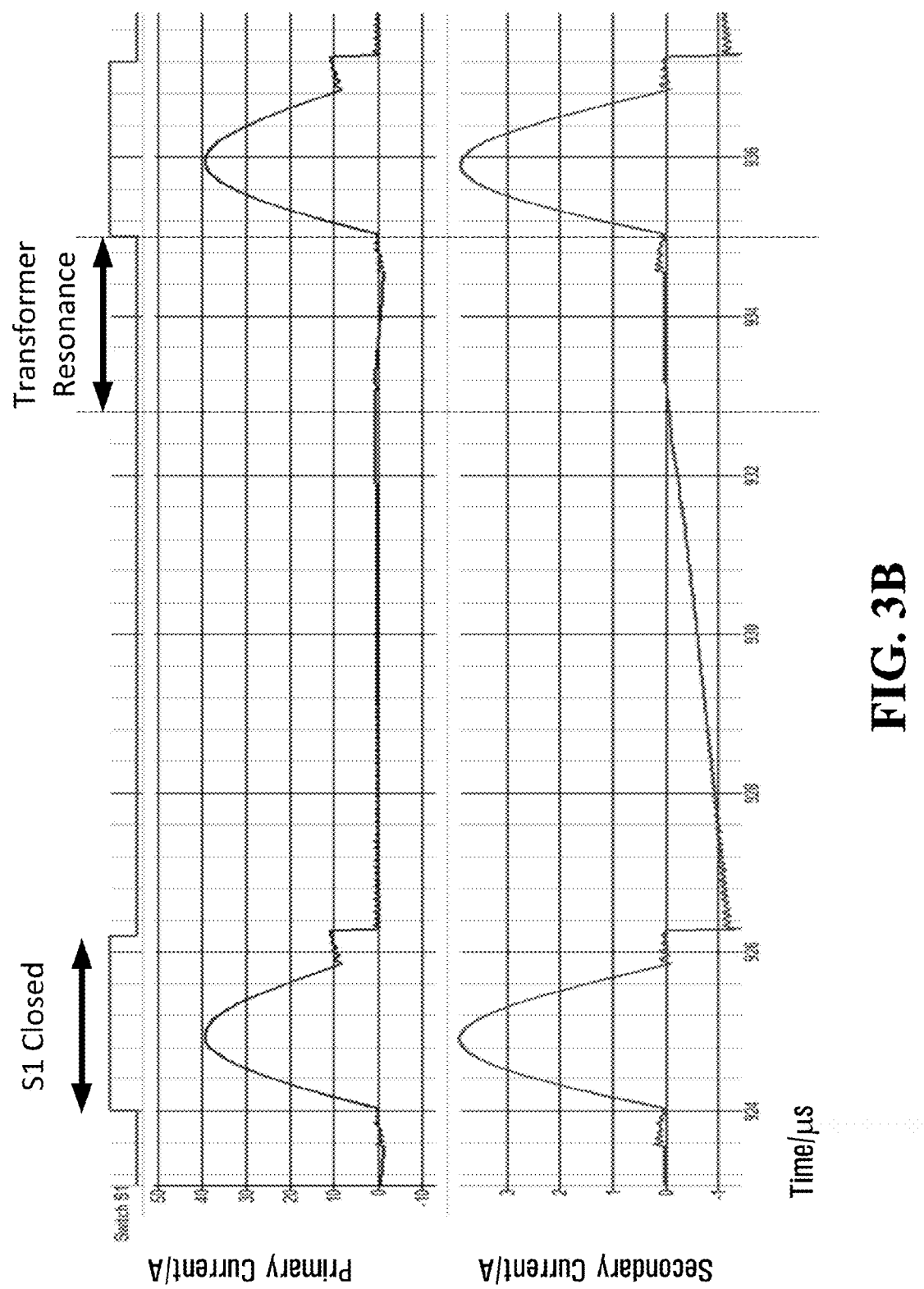
FIG. 3B is a current versus time graph illustrating simulated primary and secondary current waveforms for the example forward boost converter 200 in FIG. 2.

FIG. 3B is a current versus time graph illustrating simulated primary and secondary current waveforms for the example forward boost converter 200 in FIG. 2, produced using the commercial circuit simulator SIMPLIS. Current waveforms observed during actual operation of a forward boost converter as disclosed herein may exhibit different characteristics, which are implementation-dependent.

A unique aspect of the example converter 200 is that energy is transferred from the converter's input to its output on both the conducting and non-conducting periods of the primary switch 204. During the time primary switch 204 is closed, energy is transferred into resonant capacitance $C_{RES}$ 216 and stored in the storage inductance $L_{STOR}$ 214. During the time primary switch 204 is open, energy is transferred from resonant capacitance $C_{RES}$ 216 and storage inductance $L_{STOR}$ 214 to the output. A potential advantage of a forward boost converter as disclosed herein is thus increased efficiency and reduced losses since energy is transferred on both switching cycles. The stress on transformer 202 is less than in a traditional flyback converter since less energy needs to be stored in the transformer. Transformer 202 can be made smaller, reducing cost and size of the example converter 202 relative to flyback or forward converter designs. Component count can also be reduced since intrinsic elements of the transformer 202 like magnetisation and leakage inductance are used instead of dedicated external components.

Switching losses from opening primary switch 204 are also reduced compared to a conventional flyback converter. Referring to FIG. 3A, the current flowing through primary switch 204 when it opens consists only of the magnetisation or storage current. The resonant current is zero and the primary current is less than its maximum value. This compares favorably to a conventional flyback converter in which the primary current is a maximum when the primary switch opens. In one embodiment the opening of primary switch 204 is timed to coincide with the termination of the half sinusoid pulse, minimizing the switching losses.

The reverse bias stress on diodes 220 and 222 is also reduced in this topology. The reverse voltage on the diodes 220 and 222 is never more than $V_{OUT}$, whereas in a conventional flyback converter the reverse bias on the diodes is $V_{OUT}+V_{IN}*N/D$, where D is the duty cycle of the primary switch.

Figure 7:
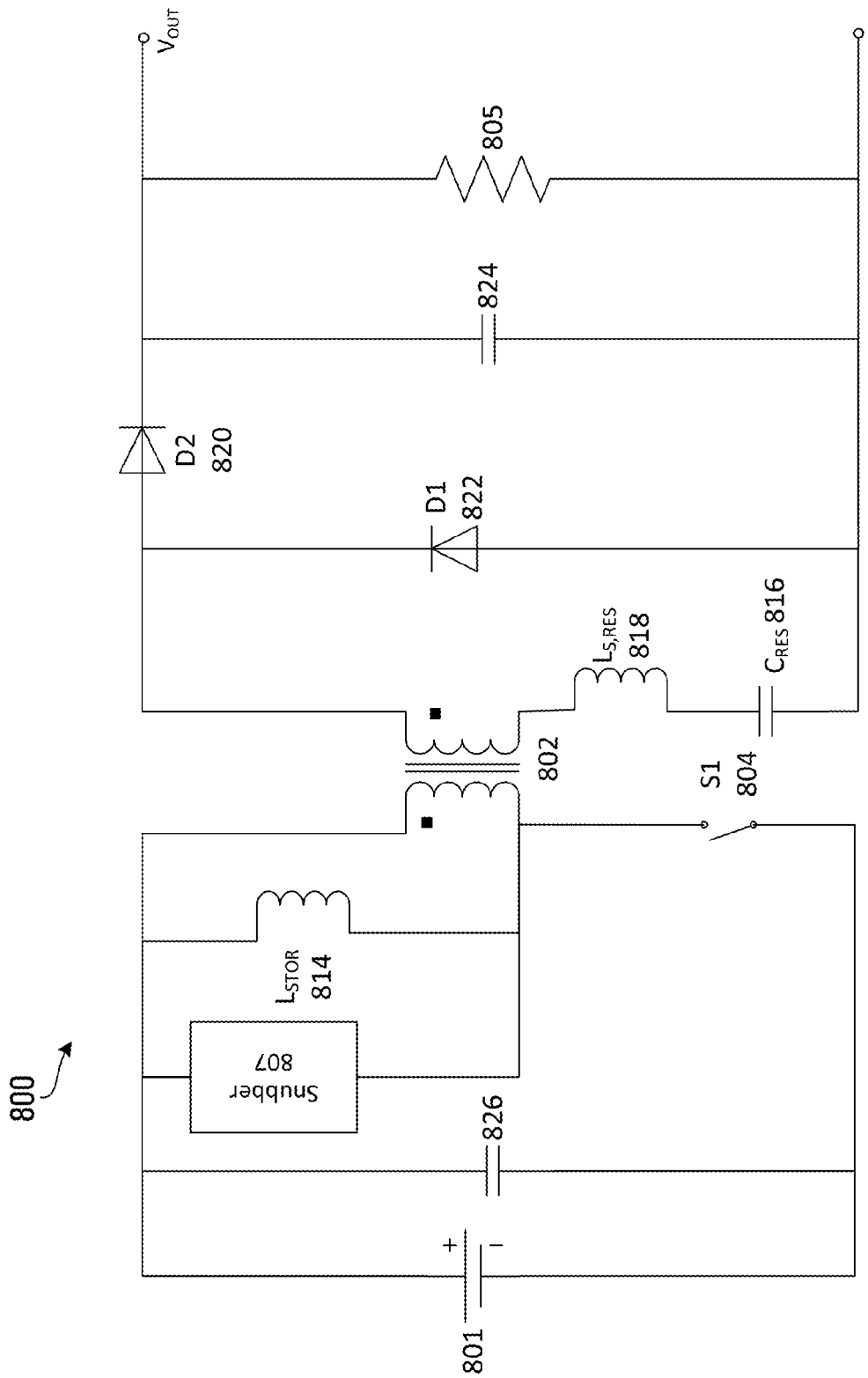
FIG. 7 is a schematic diagram illustrating an example forward boost converter circuit using a transformer with in-phase windings.

Forward boost converter design is not restricted to the use of transformers with anti-phase windings. FIG. 7 is a schematic diagram illustrating an example forward boost converter circuit 800 using a transformer with in-phase windings. Input voltage source 801 of value $V_{in}$ is applied to the input terminals and load resistance 805 is connected to the output terminals. In this example transformer 802 is a magnetic core transformer and storage inductance $L_{STOR}$ 814 consists entirely of the magnetisation inductance of transformer 802 and there is no external storage inductor. Also in this example, resonant inductance $L_{S,RES}$ 818 consists entirely of the intrinsic leakage inductance of transformer 802 of value $L_{S,LEAK}$ and there is no external resonant inductor. Like the example converter 200 in FIG. 2, the example converter 800 also includes a primary switch 804, a resonant capacitance $C_{S,RES}$ 846, diodes 820, 822, and an output capacitance 824, operatively coupled together as shown. The operation of the example converter 800 is conceptually similar to the example converter 200 in FIG. 2, which includes an anti-phase transformer. There is optionally a "snubber" circuit 807 coupled across the primary winding of the transformer 802 to limit the voltage stress on primary switch 804 when it switches off.

Figure 10:
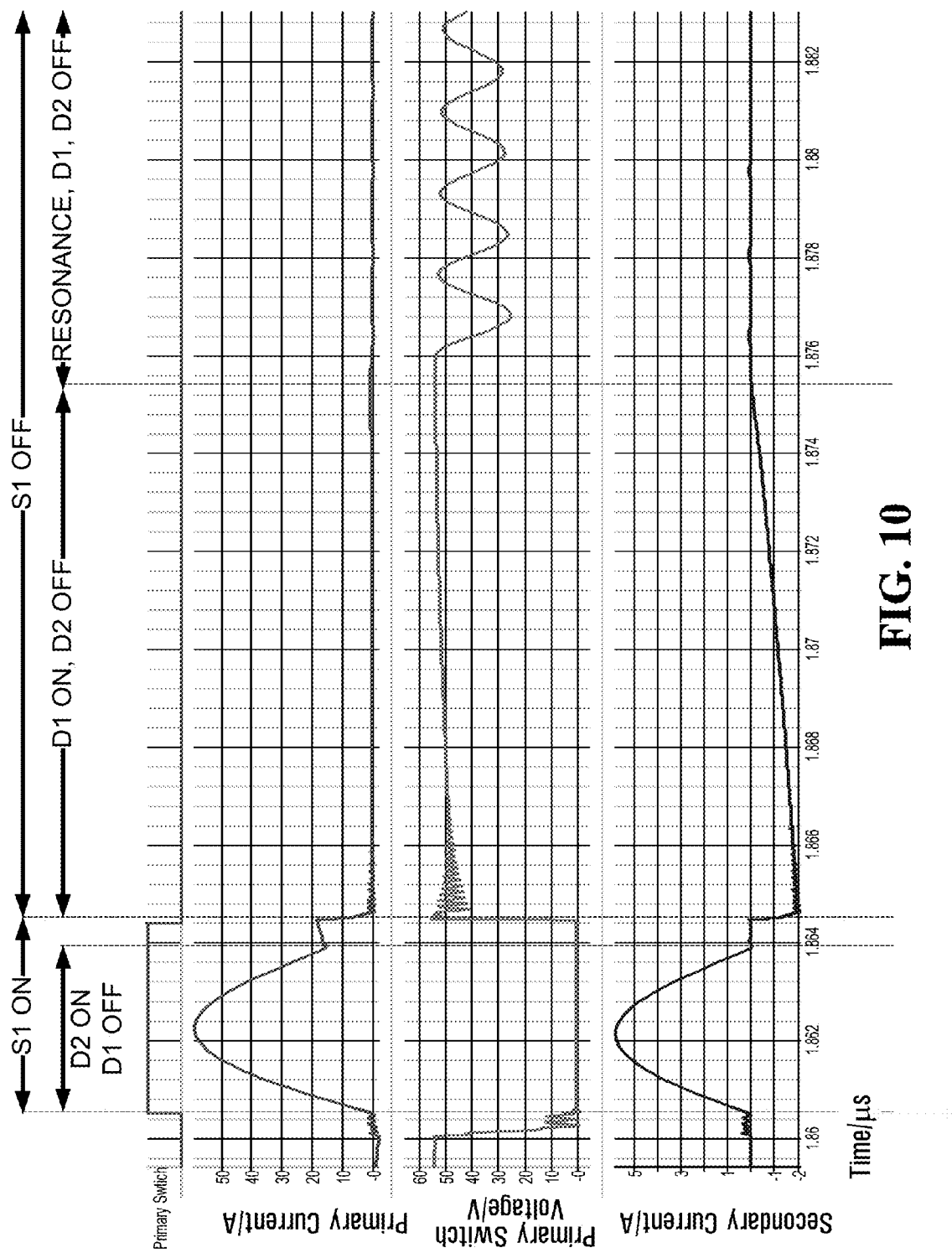
FIG. 10 is a graph illustrating a simulated voltage waveform across the primary switch 804 and simulated primary and secondary current waveforms for the example forward boost converter 800 in FIG. 7.

FIG. 10 is a graph illustrating a simulated voltage waveform across the primary switch 804 and simulated primary and secondary current waveforms for the example forward boost converter 800 in FIG. 7. The waveforms were obtained using the commercial circuit simulator SIMPLIS. Waveform characteristics may vary with different simulation parameters or actual converter implementations.

In steady state load conditions, just prior to the closing of primary switch 804, output capacitance 824 is charged to a voltage of $V_{OUT}$ and resonant capacitance $C_{RES}$ 816 is charged to slightly below $V_{OUT}-V_{IN}*N$. $V_{IN}$ and N are selected such that their product is less than $V_{OUT}$ and diode 820 is therefore reverse biased and non-conducting. Diode 822 is also reverse biased and non-conducting and no current flows in the primary and secondary windings of the transformer 802. When primary switch 804 closes to begin its conduction period, current begins to flow in the primary winding. As in the previous embodiment, the primary current has two components, the storage current flowing in the storage inductance $L_{STOR}$ 814 and a resonant current. The storage current serves to magnetise the core of transformer 802, and therefore there is no corresponding current in the secondary winding and there is no energy transfer to the output side of the example converter 800. The storage current is a approximately a linear time-dependent ramp.

When primary switch 804 closes, a voltage appears across the secondary winding of the transformer 802, forward biasing diode 820 to begin its conduction period. This contrasts with the previous embodiment 200 of FIG. 2 in which diode 222 became forward biased on the closing of the primary switch. A resonant current flows in the LC resonant circuit composed of the series combination of the leakage inductance $L_{S,RES}$ 818, capacitance $C_{RES}$ 816, and output capacitance 824.

Figure 8:
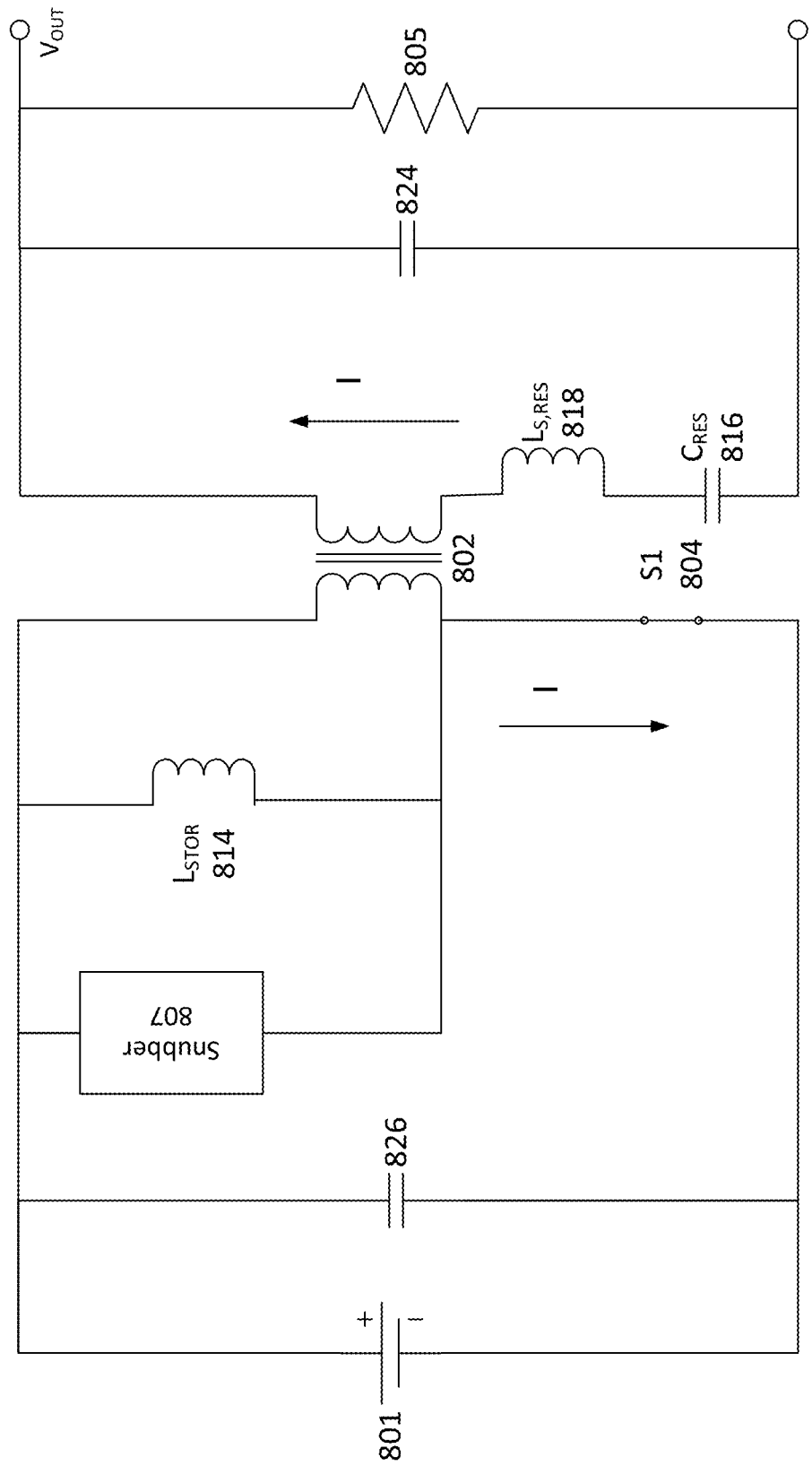
FIG. 8 is a schematic diagram illustrating an equivalent circuit for the example forward boost converter 800 in FIG. 7 while the primary switch 804 is closed.

FIG. 8 is a is a schematic diagram illustrating an equivalent circuit for the example forward boost converter 800 in FIG. 7 while the primary switch 804 is closed.

Unlike the anti-phase case (FIG. 2), output capacitance 824 is a part of the resonant circuit. Output capacitance 824, however, is chosen to be significantly larger than resonant capacitance $C_{RES}$ 816 such that the series combination of the two capacitances results in a total value of capacitance not much smaller than the value of $C_{RES}$ 816. In one embodiment capacitance $C_{RES}$ 816 has a value of 220 nF and output capacitance 824 has a value of 1 uF. As in the anti-phase case (FIG. 2), only a half sinusoid pulse of resonant current flows. Energy is therefore transferred into load 805 and output capacitance 824 from capacitance $C_{RES}$ 816 during the conduction period of the primary switch 804 in this configuration. This contrasts with the anti-phase configuration of the previous embodiment (FIG. 2) where energy was transferred into the load from capacitance $C_{RES}$ 816 during the non-conducting period of the primary switch 804.

The storage current in the primary winding continues to flow until the primary switch 804 is opened to end its conduction period. The primary current is a superposition of the storage and resonant currents as discussed above.

Figure 9:
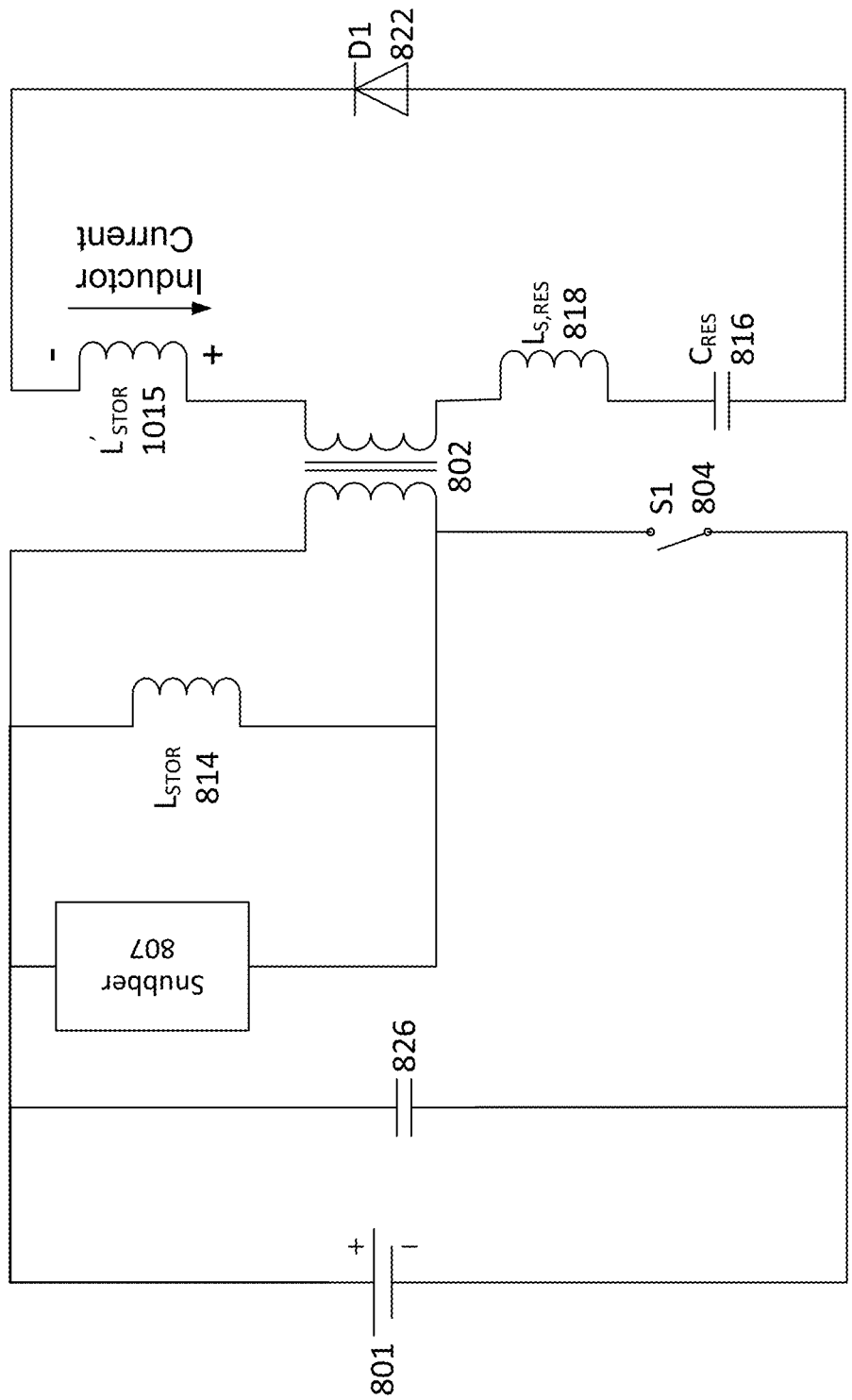
FIG. 9 is a schematic diagram illustrating an equivalent circuit for the example forward boost converter 800 in FIG. 7 when the primary switch 804 opens.

At the end of its conduction period, primary switch 804 opens and the current in the primary winding falls to zero. The energy stored in the storage inductance $L_{STOR}$ 814 begins to be transferred into the secondary side. FIG. 9 is a schematic diagram illustrating an equivalent circuit for example forward boost converter 800 in FIG. 7 when the primary switch 804 opens. The effect of the storage inductance $L_{STOR}$ 814 can be modeled as equivalent inductance $L'_{STOR}$ 1015 of value $N^2*L_{STOR}$ in the output circuit.

When primary switch 804 opens, the voltage induced across the equivalent inductance $L'_{STOR}$ 1015 is in the opposite direction to the voltage across $C_{RES}$ 816. It forward biases diode 822 to begin its conduction period, while diode 820 is reverse biased to end its conduction period.

The secondary winding current waveform is shown in FIG. 10. The secondary winding current magnitude decreases almost linearly to zero as the energy stored in $L'_{STOR}$ 1015 is transferring into resonant capacitor $C_{RES}$ 816. The core of the transformer 802 is also demagnetizing during this operation. The voltage of capacitor $C_{RES}$ 816 increases to slightly above $V_{OUT}-V_{IN}*N$ as it stores energy from the inductor current. It should be noted that the equivalent circuit in FIG. 9 is a series LC resonant circuit. However, the value of the equivalent inductance $L'_{STOR}$ 1015 is so large that the sinusoidal nature of the current cannot be clearly seen on the time scale in FIG. 10 and the current magnitude appears to decrease substantially linearly.

When the core of the transformer 802 is completely demagnetised, secondary current flow ceases and diode 822 becomes reverse biased to end its conduction period.

As in the previous embodiment the primary and secondary windings of transformer 802 are now both open and the storage inductance 814 will resonate with the parasitic capacitance elements of the circuit. The resonance creates a sinusoidally varying voltage across primary switch 804 as illustrated in FIG. 10.

As in the previous embodiment, there is no energy transfer between the input and the output during this resonant period. When the input power to the example converter 800 is very low, the converter could be kept in this resonant period state to maintain power efficiency. This can be achieved by reducing the switching frequency of the example converter 800 while maintaining the same ON period for the primary switch 804.

This forward boost topology using an in-phase transformer is conceptually similar to the topology with anti-phase transformer. Energy is transferred from the input stage of each example converter 200, 800 to its output stage on both the conducting and non-conducting periods of each primary switch 204, 804. During the conducting period of primary switch 804 energy is stored in the storage inductance 814 but energy is also transferred from resonant capacitance $C_{RES}$ 816 into load 805 and output capacitance 824. During the non-conducting period of primary switch 804 energy is transferred from the storage inductance 814 to capacitance $C_{RES}$ 816. This embodiment, like the previous embodiment, may provide for increased efficiency, smaller transformer sizing, reduced component count and reduced stress on the diodes.

Figure 11:
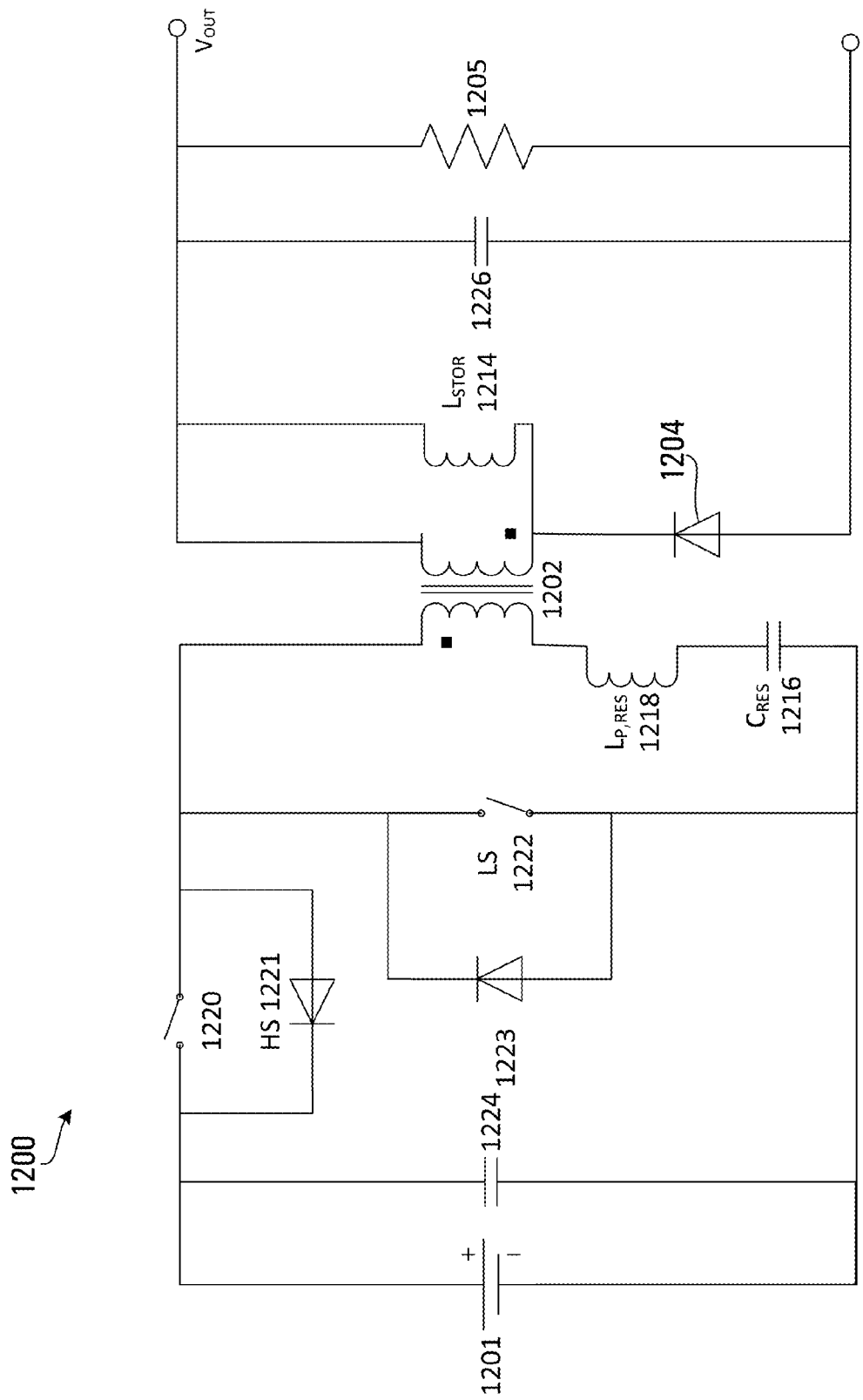
FIG. 11 is a schematic diagram illustrating an example forward boost converter operated in the reverse direction to the example forward boost converter 200 in FIG. 2.

The ability to operate a power converter in reverse could be useful, for example, in applications involving electrical storage such as batteries or fuel cells in which the storage will supply power for certain periods and accept power for other periods. FIG. 11 is a schematic diagram illustrating an example forward boost converter 1200 operated in the reverse direction to the example forward boost converter 200 in FIG. 2. An anti-phase transformer 1202 is used with a primary to secondary turns ratio of 1/N and a magnetic core in the example shown, although an in-phase transformer, or an anti-phase or in-phase air core transformer might instead be used. Storage inductance $L_{STOR}$ 1214 consists entirely of the magnetisation inductance of transformer 1202 and there is no external storage inductor. Also in this example, resonant inductance $L_{P,RES}$ 1218 consists entirely of the intrinsic leakage inductance of transformer 1202 with value $L_{S,LEAK}$ and there is no external resonant inductor.

In accordance with convention, the winding of transformer 1202 at the input side of the example forward boost converter 1200 is referred to as the primary winding and the winding at the output side is referred to as the secondary winding. However, the example forward boost converter 1200 illustrates reverse operation relative to the example forward boost converter 200 in FIG. 2, and therefore $L_{STOR}$, which is the magnetisation inductance of transformer 1202, is shown at the output side winding in FIG. 11, and $L_{P,RES}$, which is the leakage inductance of transformer 1202, is shown at the input side winding.

The example forward boost converter 1200 also includes an input source 1201, capacitance 1224, $C_{RES}$ 1216, capacitance 1226, and resistive load 1205, coupled together as shown. Controllable switches 1220, 1222 replace diodes 220/820, 222/822 in previous embodiments, and diode 1204 replaces primary switch 204, 804 in previous embodiments.

Input voltage source 1201 of value $V_{in}$ is applied to the input terminals and load resistance 1205 is connected to the output terminals.

Resonant capacitance $C_{RES}$ 1216 is now located on the input side of the circuit rather than the output side, and resonates with resonant inductance $L_{P,RES}$ 1218. Diode 1204 performs a function similar to primary switch 204 in the example forward boost converter 200, but is located on the output side of the example converter 1200. Although diode 1204 is used in this embodiment, another type of switching device such as a MOSFET or a relay could instead be used. High side switch 1220 and low side switch 1222 perform functions similar to diodes 220 and 222 of the example converter 200. Switches 1220 and 1222 can be implemented in a variety of ways. In one embodiment, they are N type MOSFET and bypass diodes, and 1221 and 1223 are the parasitic diodes formed by the P-type body and N type drain of each MOSFET.

Figure 13:
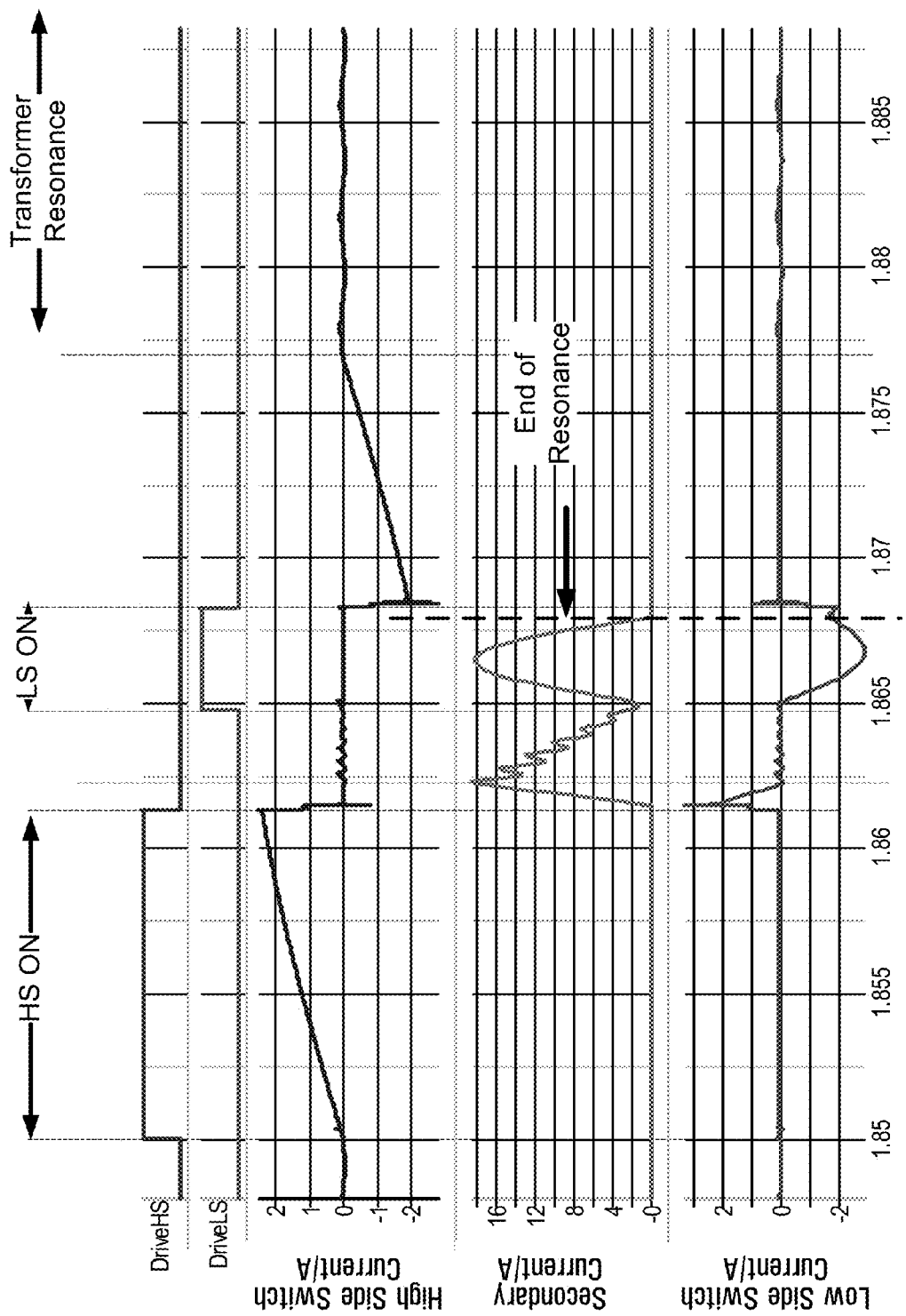
FIG. 13 is a graph illustrating simulated high side and low side switch drive voltages and current waveforms for the high side switch 1220, low side switch 1222 and secondary winding for the example forward boost converter 1200 in FIG. 11.

FIG. 13 is a graph illustrating simulated high side and low side switch drive voltages "Drive HS" and "Drive LS", respectively, and current waveforms for the high side switch 1220, low side switch 1222 and secondary winding for the example forward boost converter 1200 in FIG. 11.

At the start of the operating cycle under steady state load conditions switches 1220 and 1222 are open, capacitance 1226 is charged to voltage $V_{OUT}$, capacitance $C_{RES}$ 1216 is charged to about $V_{IN}-V_{OUT}*N$, diode 1204 is reverse biased and the core of transformer 1202 is demagnetised.

When switch 1220 is closed to begin its conduction period, input voltage source 1201 is connected across the primary winding of transformer 1202. A current begins to flow through high side switch 1220 into the primary winding and a reflected voltage appears across the secondary winding. No secondary current flows since transformer 1202 is anti-phase and keeps diode 1204 reverse biased.

Figure 12A:
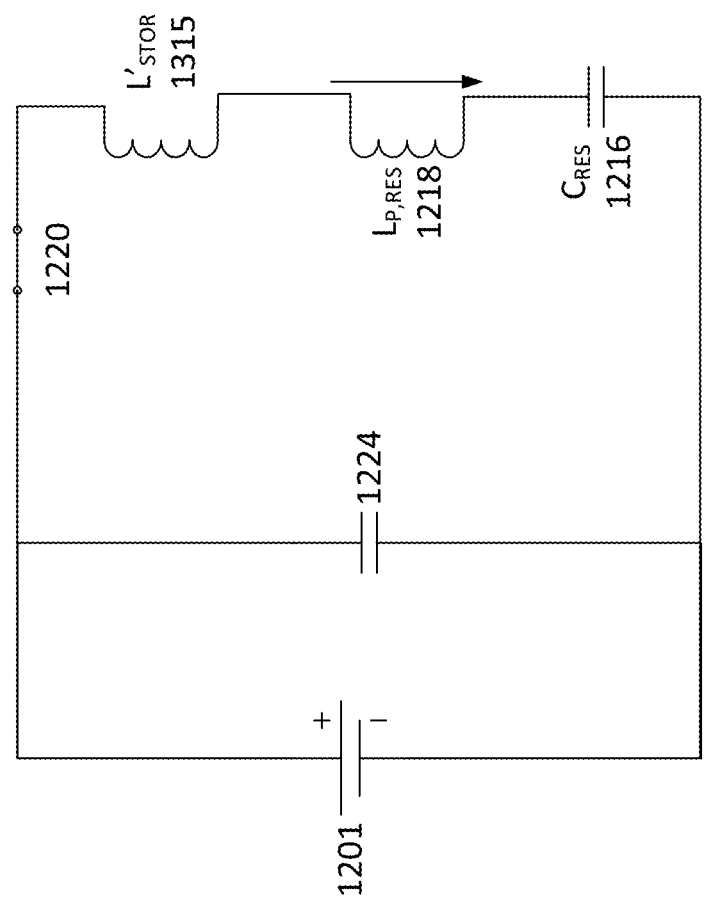
FIG. 12A is a schematic diagram illustrating an equivalent circuit for the example forward boost converter 1200 in FIG. 11 while high side switch 1220 is closed.

FIG. 12A is a schematic diagram illustrating an equivalent circuit for the example forward boost converter 1200 in FIG. 11 while high side switch 1220 closes. Reflected storage inductance $L'_{STOR}$ 1315 is in series with resonant inductance $L_{P,RES}$ 1218 and resonance capacitance $C_{RES}$ 1216. The value of the reflected storage inductance $L'_{STOR}$ 1315 is $N^2*L_{STOR}$. The primary current increases nearly linearly with time since the resonant frequency of the series combination of $L_{P,RES}$ 1218, $L'_{STOR}$ 1315 and $C_{RES}$ 1216 is low relative to the time scale of the switching. In one embodiment $L_{STOR}$ 1214 has a value of 7.2 uH, $C_{RES}$ 1216 has a value of 220 nF, $L_{S,LEAK}$ is 90 nH and N is 9. This primary current charges resonant capacitance $C_{RES}$ 1216 and stores energy in the storage inductance $L_{STOR}$ 1214. No current flows in the secondary winding of transformer 1202 since diode 1204 is reverse biased.

Figure 12C:
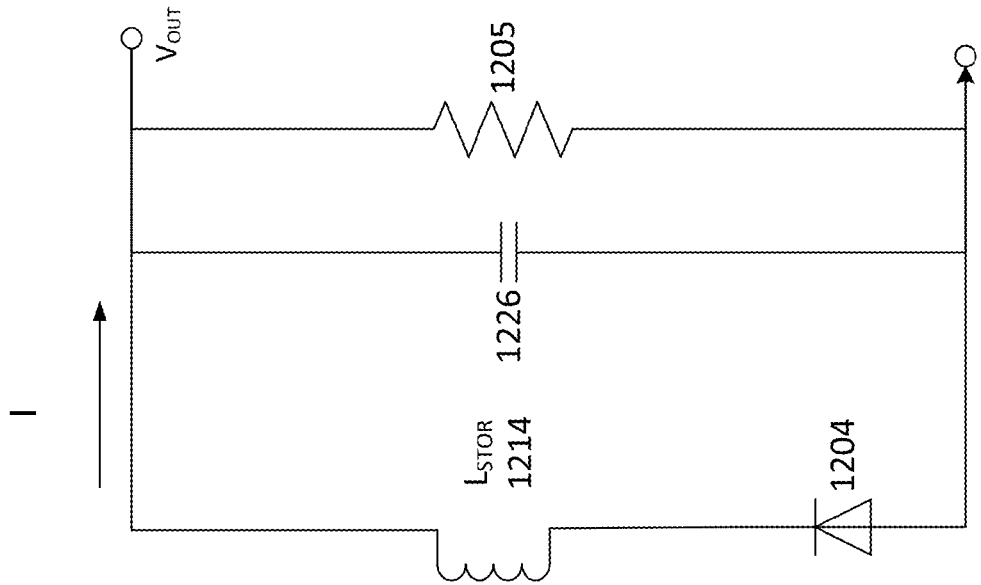
FIG. 12C is a schematic diagram illustrating an equivalent circuit for the output portion of the example forward boost converter 1200 in FIG. 11 when high side switch 1220 opens.
Figure 12B:
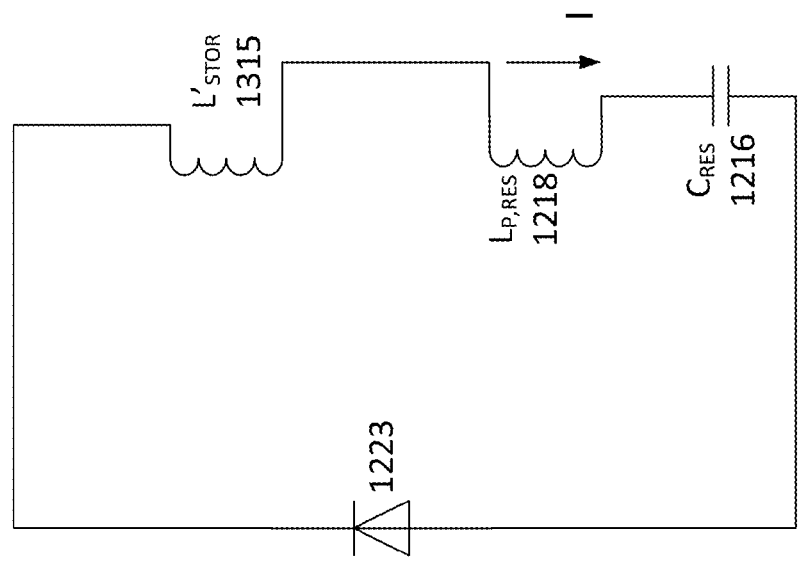
FIG. 12B is a schematic diagram illustrating an equivalent circuit for the input portion of the example forward boost converter 1200 in FIG. 11 when high side switch 1220 opens.

When high side switch 1220 is opened to end its conduction period, the current through it stops and the energy stored in storage inductance 1214 begins to transfer to the output. FIG. 12B is a schematic diagram illustrating an equivalent circuit for the input portion of the example forward boost converter 1200 in FIG. 11 when high side switch 1220 opens. The primary winding current does not fall immediately to zero since the diode 1223 across switch 1222 briefly provides a path for continued flow. This current appears as the small current spike in the low side switch current waveform in FIG. 13 co-incident with the falling edge of the DRIVE_HS voltage.

In the output portion of the example converter 1200, the voltage across storage inductance $L_{STOR}$ 1214 forward biases diode 1204 to begin its conduction period. FIG. 12C is a schematic diagram illustrating an equivalent circuit for the output portion of the example forward boost converter 1200 in FIG. 11 when high side switch 1220 opens. Secondary current flows as storage inductance $L_{STOR}$ 1214 discharges into load 1205 and output capacitance 1226. The current flow decreases approximately linearly, as shown in FIG. 13.

Figure 12D:
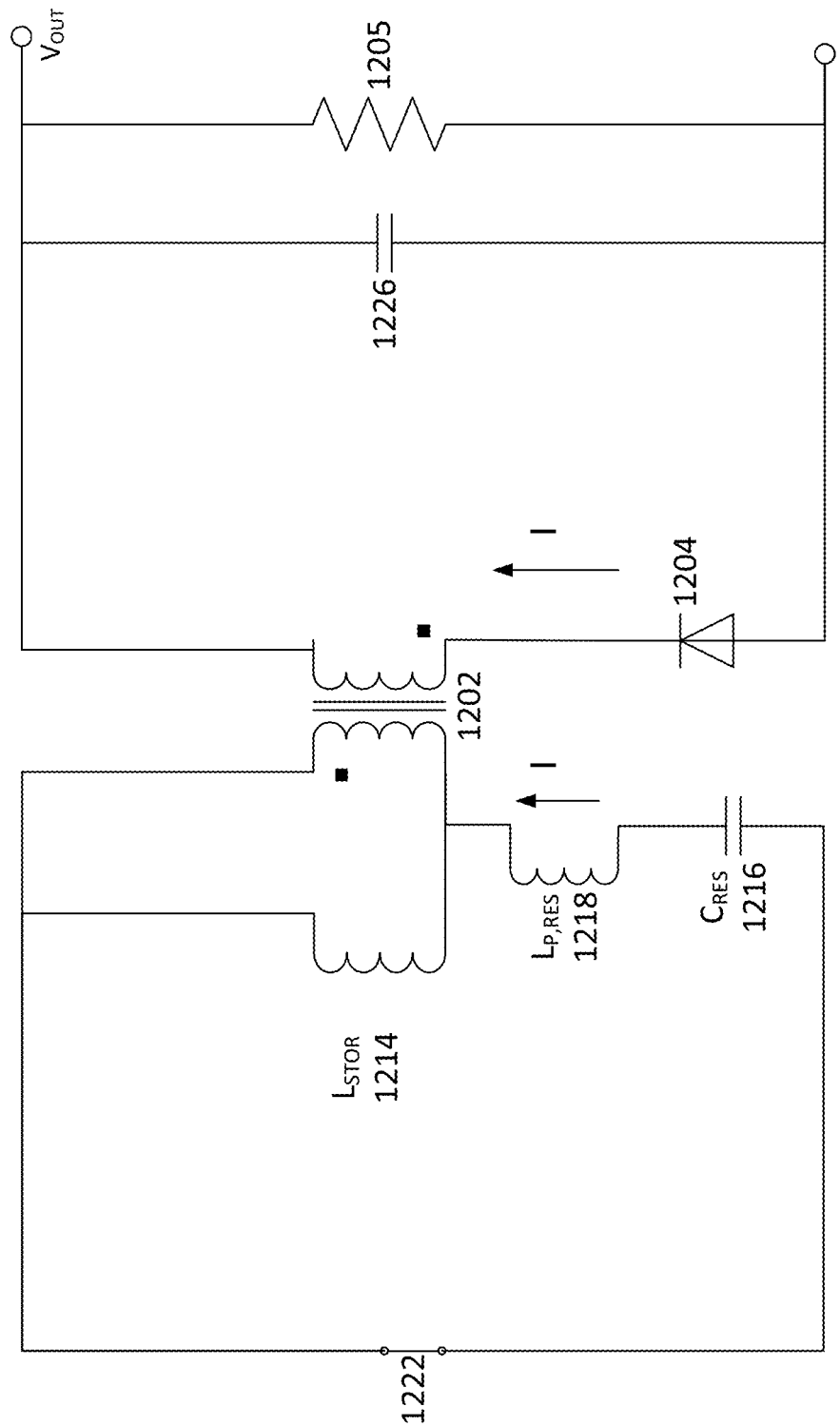
FIG. 12D is a schematic diagram illustrating an equivalent circuit for the input portion of the example forward boost converter 1200 in FIG. 11 when the low side switch 1222 is closed.

After storage inductance $L_{STOR}$ 1214 has discharged, low side switch 1222 is closed to begin its conduction period, forming a series LC resonant circuit from resonant capacitance $C_{RES}$ 1216 and resonant inductance $L_{P,RES}$ 1218 in the primary winding. FIG. 12D is a schematic diagram illustrating an equivalent circuit for the example forward boost converter 1200 in FIG. 11 when low side switch 1222 is closed. Resonant inductance $L_{P,RES}$ 1218 and resonant capacitance $C_{RES}$ 1216 form a series resonant circuit with resonant frequency $\omega_R$ of value $$\omega_R = \frac{1}{\sqrt{L_{S,LEAK} C_{RES}}}.$$

Resonant currents flow in both the primary and secondary windings. As in the previous examples, a maximum of a half sinusoid current pulse will flow before diode 1204 becomes reverse biased to end its conduction period.

Capacitance $C_{RES}$ 1216 also supplies current into storage inductance $L_{STOR}$ 1214, energizing it. This storage current is approximately a linear ramp due to the much greater inductance of $L_{STOR}$ 1214. The current through low side switch 1222 is therefore the sum of the resonant and storage currents and is a half sinusoid pulse impressed on a linear ramp. The storage current is not reflected into the secondary and the secondary current therefore consists only of the resonant current and has the shape of a half sinusoid. The secondary current ceases once the half sinusoid completes and diode 1204 is reverse biased.

Figure 12E:
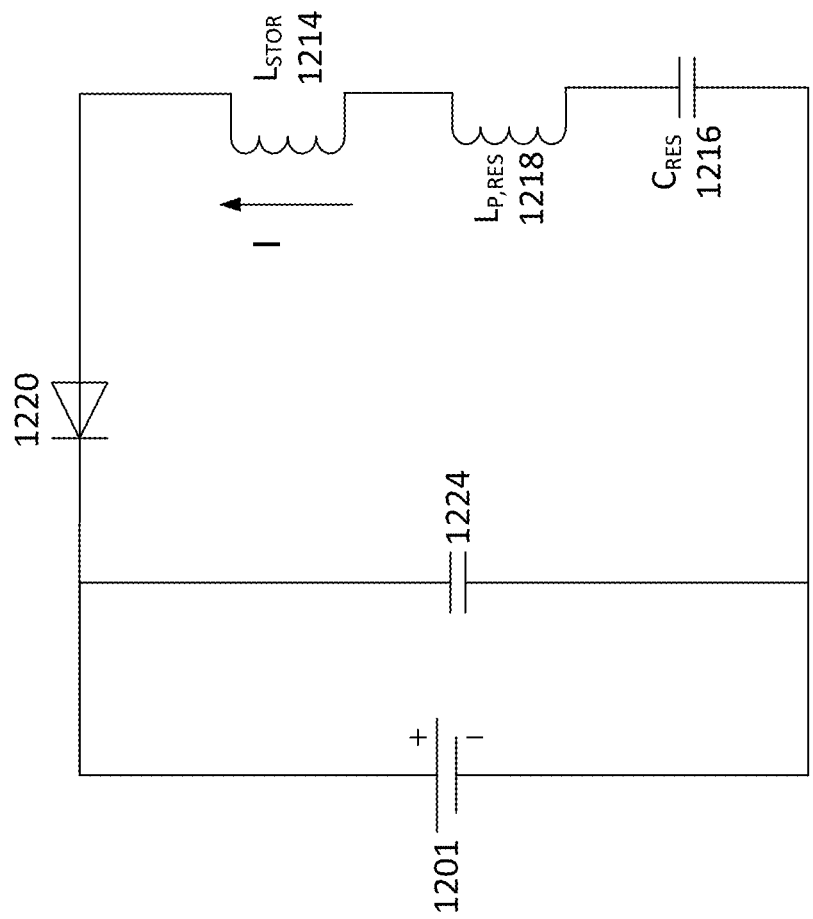
FIG. 12E is a schematic diagram illustrating an equivalent circuit for the input portion of the example forward boost converter 1200 in FIG. 11 when the low side switch opens.

The storage current through low side switch 1222 continues until it is opened to end its conduction period. The voltage across storage inductance $L_{STOR}$ 1214 then reverses to maintain the current and forward biases diode 1221 across high side switch 1222. FIG. 12E is a schematic diagram illustrating an equivalent circuit for the input portion of the example forward boost converter 1200 in FIG. 11 when low side switch 1222 is opened.

The storage current decreases linearly to zero and diode 1221 becomes reverse biased. No secondary current flows since diode 1204 is reverse biased.

Both windings of the transformer 1202 are now open and the transformer resonates. As in the previous embodiment no energy transfer takes place between the input and output of the example converter 1200 during this resonant period. When the input power to the example converter 1200 is very low, the converter could be kept in this resonant period state to maintain power efficiency. This can be achieved by reducing the switching frequency of the example converter 1200 while maintaining the same ON periods for low side switch 1222 and high side switch 1220.

The foregoing describes particular embodiments, but is not meant to be limiting. For example, although an anti-phase transformer was used in the example of reverse operation of a forward boost converter, an in-phase transformer could be used. Although the parasitic leakage inductance of the transformer 1202 is used to form a resonant circuit with resonant capacitance 1216, a dedicated and separate, discrete inductor could be used for that purpose. Although the magnetisation inductance of the transformer 1202 is used as the storage inductance 1214, a dedicated and separate, discrete inductor could be used for this purpose.

Figure 14:
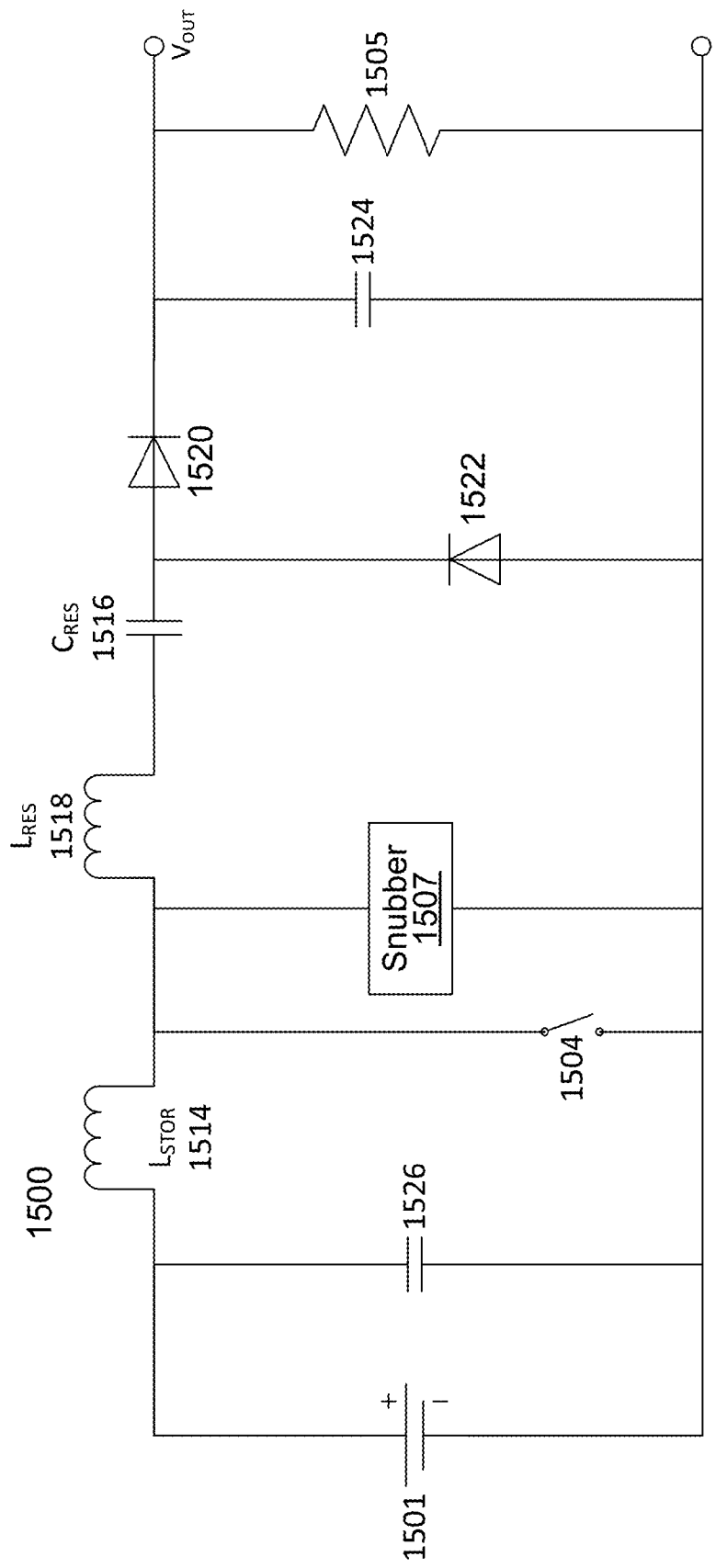
FIG. 14 is a schematic diagram illustrating another example forward boost converter.

Embodiments of the forward boost converter are not limited to converters employing transformers between their inputs and outputs. FIG. 14 is a schematic diagram illustrating another example forward boost converter 1500. There is no transformer and the inductive elements are provided by inductors 1514, 1518. The operation of the example converter 1500 is, however, similar to the previously described forward boost converters. Like the other embodiments, described above, the example forward boost converter 1500, in addition to the inductive elements 1514, 1518, includes an input source 1501, capacitive elements 1526, 1516, 1524, and switching elements 1504, 1520, 1522. A resistive load is also shown at 1505, and an optional snubber is shown at 1507.

At the beginning of an operating cycle, capacitance 1524 is charged to $V_{OUT}$, capacitance $C_{RES}$ 1516 is charged to approximately $V_{IN}-V_{OUT}$ and diodes 1522 and 1520 are reverse biased. When switch 1504 closes to begin its conduction period, a storage current flows into storage inductance $L_{STOR}$ 1514 from supply 1501. Diode 1522 also becomes forward biased to begin its conduction period, and a resonant current flows through the series combination of resonant capacitance $C_{RES}$ 1516 and resonant inductance $L_{RES}$ 1518. As in the previous examples the resonant current consists of a half sinusoidal current pulse while the storage current consists of a linear ramp. No energy is transferred to load 1505. When switch 1504 opens to end its conduction period, the voltage across storage inductance $L_{STOR}$ 1514 reverses, diode 1520 becomes forward biased to begin its conduction period, and diode 1522 becomes reverse biased to end its conduction period. The current in $L_{STOR}$ 1514 decreases approximately linearly to zero as the energy stored in it is transferring into output capacitance 1524 and load 1505. The energy stored in the resonant capacitance $C_{RES}$ 1516 is also transferred into load 1505 and output capacitance $C_{RES}$ 1524 by the storage inductor current, creating the characteristic "boost" in energy.

Figure 15:
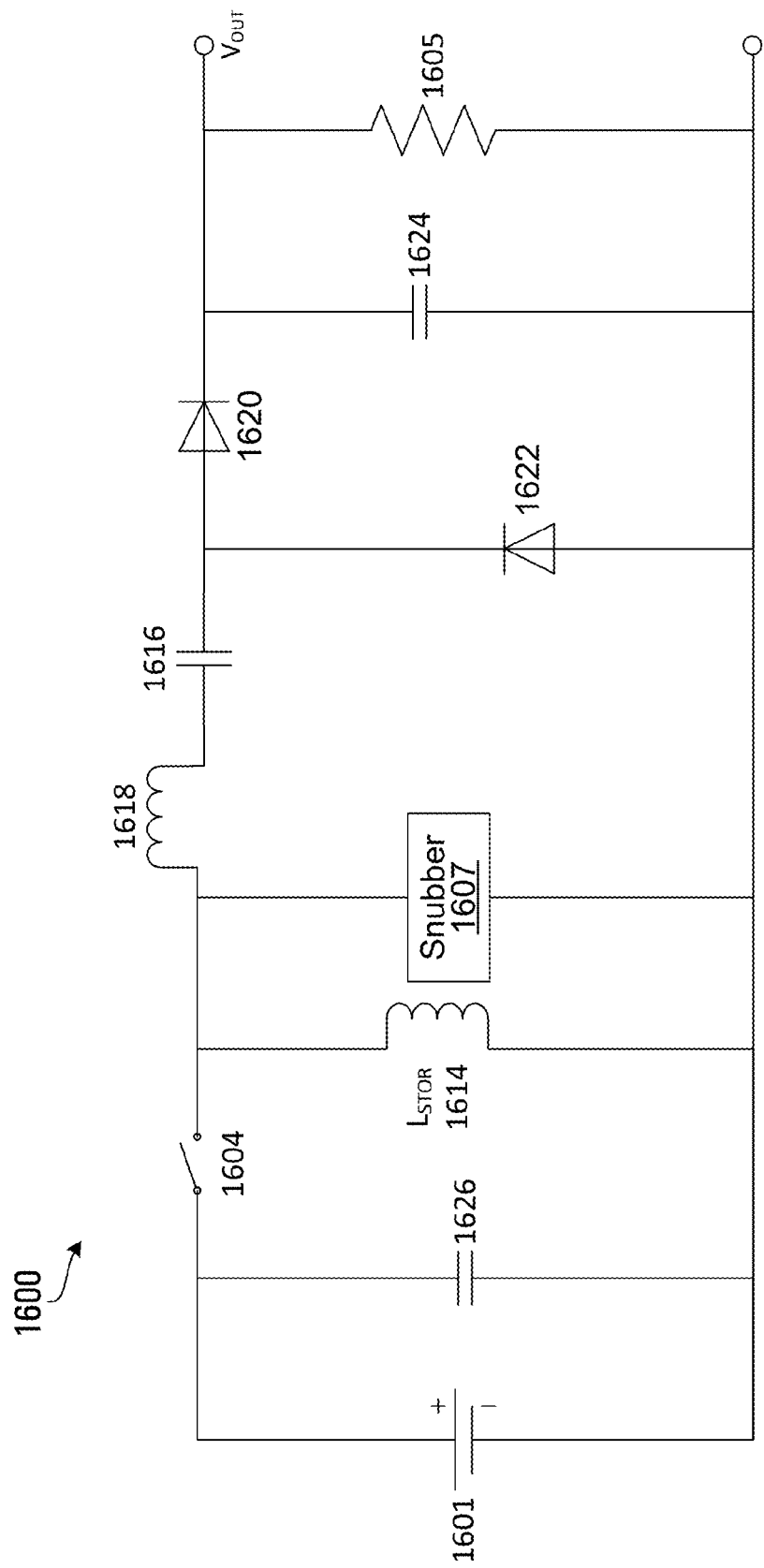
FIG. 15 is a schematic diagram illustrating an alternate example of a forward boost converter.

FIG. 15 is a schematic diagram illustrating an alternate example of a forward boost converter 1600 which functions in substantially the same manner as 1500. The example forward boost converter 1600 includes an input voltage source 1601, capacitive elements 1626, 1616, 1624, inductive elements 1614, 1618, switching elements 1604, 1622, 1620, resistive load 1605, and optionally a snubber 1607, coupled together as shown.

At the beginning of a cycle switch 1604 closes to begin its conduction period and storage current flows into storage inductance $L_{STOR}$ 1614. Diode 1620 becomes forward biased to begin its conduction period, and resonant current flows through inductance 1618 and capacitance 1616 into capacitance 1624 and load 1605. After the half sinusoid pulse completes, switch 1604 opens to end its conduction period, diode 1622 becomes forward biased to begin its conduction period, and diode 1620 becomes reverse biased to end its conduction period, placing storage inductance 1614 in series with resonant inductance 1618 and resonant capacitance 1616. The current in $L_{STOR}$ 1614 decreases approximately linearly to zero as the resonant capacitance 1616 charges up to $V_{OUT}$.

Figure 16:
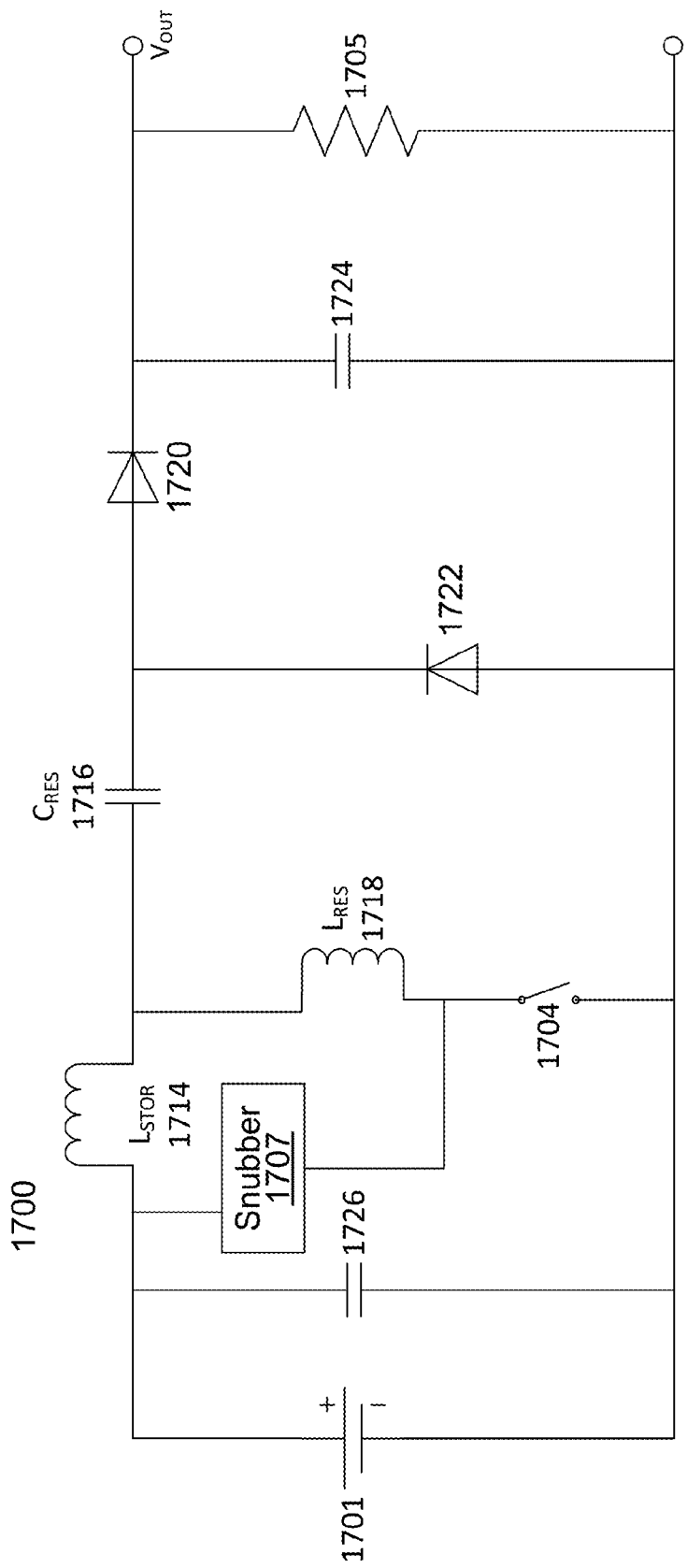
FIG. 16 is a schematic diagram illustrating another example of a forward boost converter.

FIG. 16 is a schematic diagram illustrating another example of a forward boost converter 1700 which functions in substantially the same manner as the example forward boost converter 1500. The example forward boost converter 1700 includes an input voltage source 1701, capacitive elements 1726, 1716, 1724, inductive elements 1714, 1718, switching elements 1704, 1722, 1720, resistive load 1705, and optionally snubber 1707, coupled together as shown. In this example converter 1700, storage inductance 1714 charges through resonant inductance 1718 during the conduction period of switch 1704 and discharges through resonant capacitance 1716 during the non-conducting period of switch 1714.

Figure 17:
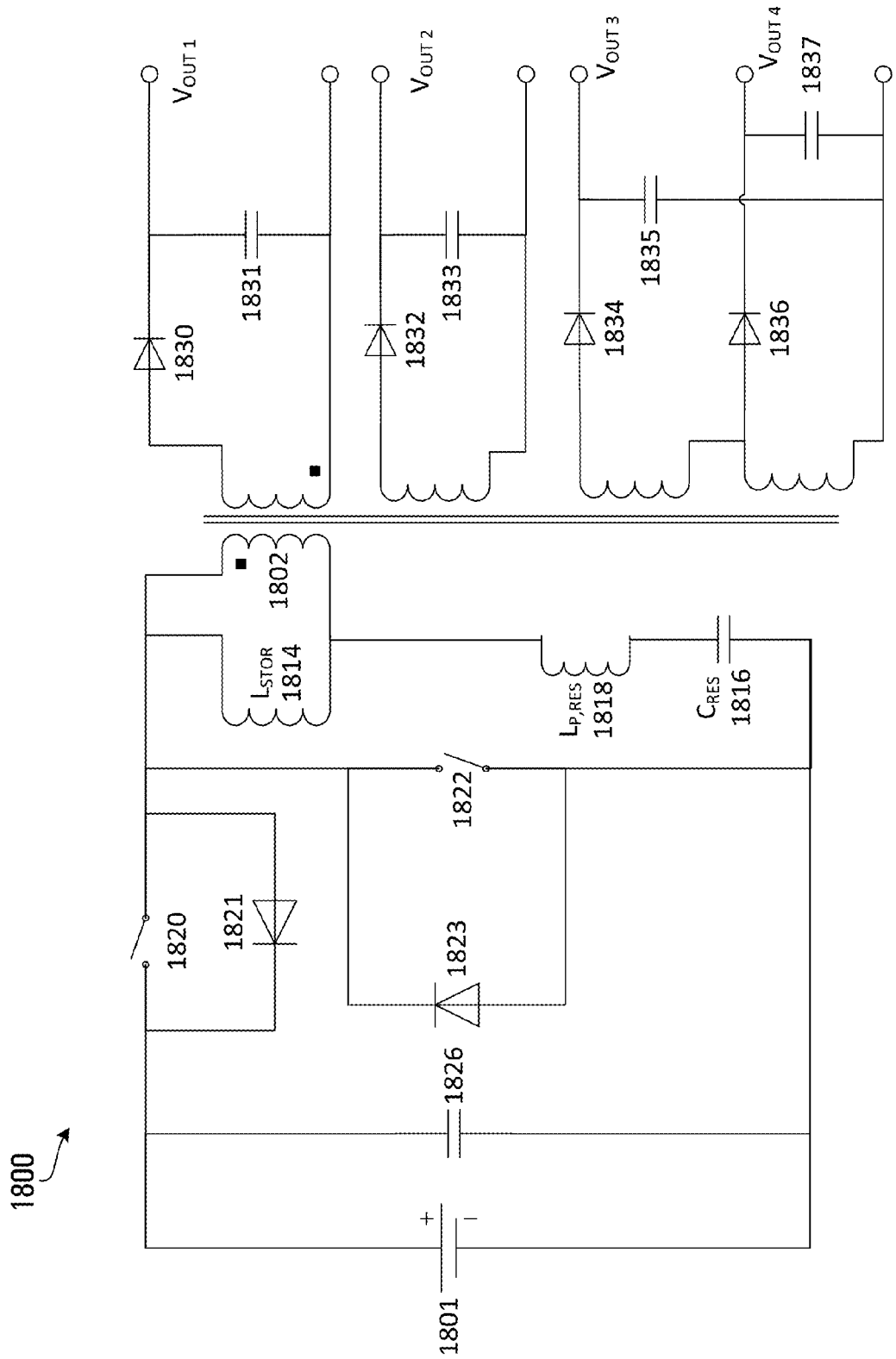
FIG. 17 is a schematic diagram illustrating an example forward boost converter with multiple secondary windings in reverse operation.

Forward boost converters as disclosed herein are also not limited to transformers with a single secondary winding. FIG. 17 is a schematic diagram illustrating an example forward boost converter 1800 in reverse operation with multiple secondary windings. The primary side of the example converter 1800 includes an input source 1801, capacitive elements 1826, 1816, inductive elements 1818 and 1814, high side and low side switches 1820, 1822 with parasitic diodes 1821, 1823, and the primary winding of the transformer 1802. Each secondary winding is coupled to a diode 1830, 1832, 1834, 1836 and an output capacitive element 1831, 1833, 1835, 1837. The multiple secondary windings produce output voltages $V_{OUT1}$, $V_{OUT2}$, $V_{OUT3}$ and $V_{OUT4}$ in the example shown. Output voltage $V_{OUT3}$ is across the entire split secondary winding shown in FIG. 17, and $V_{OUT4}$ is across the lower portion of the split secondary winding. The output terminal pairs for output voltages $V_{OUT3}$ and $V_{OUT4}$ thus share one common terminal, specifically the lower terminal of the split secondary winding in this example.

In FIG. 17, the storage inductance $L_{STOR}$ 1814 is shown across the primary winding of transformer 1802 according to common convention and for simplicity. It will be understood, however, that $L_{STOR}$ will appear as a reflected inductance in each of the secondary windings and is reflected by the square of the ratio of their respective number of turns.

FIGS. 18 to 22 are schematic diagrams illustrating equivalent circuits for example forward boost converter operating states.

FIGS. 18 to 22 are schematic diagrams illustrating equivalent circuits for example states of the forward boost converter. The equivalent circuit shown in FIG. 18 for a state 1 is common to the example embodiments shown in FIGS. 2, 7, 11, and 14 to 17, in which a first inductance is coupled to a first switch in a first circuit path across a first terminal pair. The storage inductance $L_{STOR}$ is coupled across one of the converter's two terminal pairs by a conducting switch, labelled in FIG. 18 as "1$^{st}$ Switch", during a conduction period of that switch. In this state, and in forward operation of a forward boost converter, energy is transferred into the storage inductance $L_{STOR}$ from the terminals. In this state, but in reverse operation, energy is transferred out of the storage inductance $L_{STOR}$ into the terminals.

Embodiments of the forward boost converter as disclosed herein also use a combination of states 2 and 4 (FIGS. 19 and 21) or states 3 and 5 (FIGS. 20 and 22).

Considering forward operation as an example, in state 2, a circuit path including the resonant capacitance $C_{RES}$ and storage inductance $L_{STOR}$ is completed by a conducting low side switch, labelled as "3$^{rd}$ Switch" in FIG. 19, during its conduction period and energy flows into the resonant capacitance from the storage inductance. In state 4, a circuit path including the resonant capacitance $C_{RES}$ and resonant inductance $L_{P,RES}$ is coupled to the second terminal pair during a conduction period of a high side switch, labelled as "2$^{nd}$ Switch" in FIG. 21, and energy is transferred from the resonant capacitance into the terminal pair.

In state 3, a circuit path including the storage inductance $L_{STOR}$ and the resonant capacitance $C_{RES}$ is coupled across the second terminal pair by the conducting high side switch during its conduction period. In this state, in forward operation, energy is transferred into the terminals from the storage inductance $L_{STOR}$ and the resonant capacitance $C_{RES}$. In this state, in reverse operation, energy is transferred from the terminals into the storage inductance $L_{STOR}$ and resonant capacitance $C_{RES}$. Although the resonant inductance $L_{P,RES}$ is shown in series with the resonant capacitance $C_{RES}$ and storage inductance $L_{STOR}$ in FIG. 20, this is optional and does not occur in all embodiments, such as in the example converter shown in FIG. 16.

In state 5, a circuit path including the resonant inductance $L_{P,RES}$ and resonant capacitance $C_{RES}$ is completed by the conducting low side switch during its conduction period and the inductance and capacitance resonate for a maximum of a half cycle.

What has been described is merely illustrative of the application of principles of embodiments. Other arrangements and methods can be implemented by those skilled in the art without departing from the scope of the present invention.

For example, although the load in the preceding embodiments is shown as resistive, forward boost converters as disclosed herein are not restricted to driving resistive loads.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

We claim:

1. A switching mode power converter coupled between a first terminal pair and a second terminal pair, the converter comprising:
    a first inductance coupled to a first switch in a first circuit path across said first terminal pair, said first switch coupling said first inductance across said first terminal pair during a conduction period of said first switch;
    a capacitance coupled to a second inductance in a second circuit path, and to said first inductance in a third circuit path;
    a second switch and a third switch, said second switch operated to be in a non-conducting state when said third switch is in a conducting state and said third switch operated to be in a non-conducting state when said second switch is in a conducting state,
    said second switch completing a circuit between said second terminal pair and one of:
        said second circuit path and said third circuit path during a conduction period of said second switch,
    said third switch completing the other of: said second circuit path and said third circuit path during a conduction period of said third switch.

2. The switching mode power converter of claim 1, wherein said first terminal pair and said second terminal pair share a common terminal.

3. The switching mode power converter of claim 1, said first terminal pair comprising an input terminal pair, said second terminal pair comprising an output terminal pair, said capacitance transferring energy to said output terminal pair during said conduction period of said second switch.

4. The switching mode power converter of claim 3, said first inductance being coupled to said capacitance and transferring energy to said output terminal pair during said conduction period of said second switch.

5. The switching mode power converter of claim 3, said first inductance being coupled to said capacitance and transferring energy to said capacitance during said conduction period of said third switch.

6. The switching mode power converter of claim 1, said first terminal pair comprising an output terminal pair, said second terminal pair comprising an input terminal pair, said first inductance transferring energy to said output terminal pair during said conduction period of said first switch.

7. The switching mode power converter of claim 6, said first inductance being coupled to said capacitance and storing energy from said input terminal pair during said conduction period of said second switch.

8. The switching mode power converter of claim 7, said first inductance and said capacitance transferring energy to said output terminal pair during said conduction period of said first switch.

9. The switching mode power converter of claim 1, said first inductance being coupled to said capacitance through a transformer.

10. The switching mode power converter of claim 9, said first inductance comprising magnetisation inductance of said transformer.

11. The switching mode power converter of claim 9, said second inductance comprising leakage inductance of said transformer.

12. The switching mode power converter of claim 9, said transformer comprising a first winding coupled across said first inductance and a second winding coupled in said second circuit path with said capacitance and said second inductance.

13. The switching mode power converter of claim 12, said transformer further comprising a third winding.

14. The switching mode power converter of claim 10, said transformer further comprising a third winding, said switching mode power converter further comprising a fourth switch coupled to said third winding and a reflected inductance of said transformer magnetization inductance in a fourth circuit path across a third terminal pair, said fourth switch having said conduction period of said third switch and coupling said fourth circuit path across said third terminal pair during said conduction period of said third and fourth switches.

15. The switching mode power converter of claim 10, said transformer further comprising a third winding, said switching mode power converter further comprising:
a fourth switch coupled to said third winding and a first reflected inductance of said transformer magnetisation inductance in a fourth circuit path across a third terminal pair, said fourth switch having said conduction period of said third switch and coupling said fourth circuit path across said third terminal pair during said conduction period of said third and fourth switches;
a fifth switch coupled to a portion of said third winding and a second reflected inductance of said transformer magnetization inductance in a in a fifth circuit path across a fourth terminal pair, said fifth switch having said conduction period of said third switch and coupling said fifth circuit path across said fourth terminal pair during said conduction period of said third and fifth switches.

16. The switching mode power converter of claim 1, further comprising one or more of:
a capacitance coupled across said first terminal pair; and
a capacitance coupled across said second terminal pair.

17. The switching mode power converter of claim 9 wherein said first inductance resonates during a non-conduction period of said first switch, said second switch and said third switch to produce a time varying voltage across said first switch.

18. The switching mode power converter of claim 17 wherein said first switch enters said conduction period while said voltage is at an oscillatory minimum.

19. A method of operation of a switching mode power converter coupled between a first terminal pair and a second terminal pair, the converter comprising: a first inductance coupled to a first switch in a first circuit path across said first terminal pair; a capacitance coupled to a second inductance in a second circuit path, and to said first inductance in a third current circuit path; a second switch and a third switch, said second switch operated to be in a non-conducting state when said third switch is in a conducting state and said third switch operated to be in a non-conducting state when said second switch is in a conducting state, said method comprising:
closing of said first switch to couple said first inductance across said first terminal pair during a conduction period of said first switch;
closing of said second switch to complete a circuit between said second circuit path or said third circuit path and said second terminal pair during a conduction period of said second switch so as to transfer energy into said second terminal pair; and
closing of said third switch to complete said second circuit path or said third circuit path during a conduction period of said third switch so as to transfer energy into said capacitance.

20. Apparatus comprising:
a switching mode power converter coupled between a first terminal pair and a second terminal pair, the converter comprising: a first inductance coupled to a first switch in a first circuit path across said first terminal pair; a capacitance coupled to a second inductance in a second circuit path, and to said first inductance in a third current circuit path; a second switch and a third switch, said second switch operated to be in a non-conducting state when said third switch is in a conducting state and said third switch operated to be in a non-conducting state when said second switch is in a conducting state;
means for closing said first switch to couple said first inductance across said first terminal pair during a conduction period of said first switch;
means for closing said second switch to complete a circuit between said second circuit path or said third circuit path and said second terminal pair during a conduction period of said second switch so as to transfer energy into said second terminal pair; and
means for closing said third switch to complete said second circuit path or said third circuit path during a conduction period of said third switch so as to transfer energy into said capacitance.

21. The method of claim 19, wherein:
the closing of said first switch to couple said first inductance across said first terminal pair during a conduction period of said first switch transfers energy by a substantially linearly varying current;
the closing of said second switch to complete a circuit between said second circuit path and said second terminal pair during a conduction period of said second switch transfers energy by a substantially half sinusoidal current pulse;
the closing of said second switch to complete a circuit between said third circuit path and said second terminal pair during a conduction period of said second switch transfers energy by a substantially linearly varying current;
the closing of said third switch to complete said second circuit path during a conduction period of said third switch transfers energy into said capacitance by a resonance of said capacitance for a half sinusoid cycle; and
the closing of said third switch to complete said third circuit path during a conduction period of said third switch transfers energy into said capacitance by a substantially linearly varying current.

22. The method of claim 21, comprising:
operation of said switching mode power converter in a forward direction wherein energy is transferred from said first terminal pair to said second terminal pair.

23. The method of claim 21, comprising:

operation of said switching mode power converter in a reverse direction wherein energy is transferred from said second terminal pair to said first terminal pair.

\* \* \* \* \*

UNITED STATES PATENT AND TRADEMARK OFFICE
CERTIFICATE OF CORRECTION

| | | |
|---|---|---|
| PATENT NO. | : 9,219,421 B2 | Page 1 of 1 |
| APPLICATION NO. | : 13/657171 | |
| DATED | : December 22, 2015 | |
| INVENTOR(S) | : Gabriel Scarlatescu | |

It is certified that error appears in the above-identified patent and that said Letters Patent is hereby corrected as shown below:

In the Claims:

In claim 15, Column 19, line 43, please change "magnetization" to --magnetisation--.

In claim 15, Column 19, line 43, please change "in a in a" to --in a--.

In claim 16, Column 19, line 51, please change "a capacitance" to --a second capacitance--.

In claim 16, Column 19, line 52, please change "a capacitance" to --a third capacitance--.

Signed and Sealed this
Seventeenth Day of May, 2016

Michelle K. Lee
*Director of the United States Patent and Trademark Office*